US012506948B2

United States Patent
Vállez Enano et al.

(10) Patent No.: US 12,506,948 B2
(45) Date of Patent: Dec. 23, 2025

(54) SYSTEM AND METHOD FOR CAPTURING IMAGES OF OBJECTS THAT ARE MOVING RELATIVE TO A CAMERA

(71) Applicant: UBOTICA TECHNOLOGIES LIMITED, Dublin (IE)

(72) Inventors: Noelia Vállez Enano, Dublin (IE); Aubrey Dunne, Dublin (IE); José Luis Espinosa Aranda, Dublin (IE)

(73) Assignee: UBOTICA TECHNOLOGIES LIMITED, Dublin (IE)

( * ) Notice: Subject to any disclaimer, the term of this patent is extended or adjusted under 35 U.S.C. 154(b) by 38 days.

(21) Appl. No.: 18/515,347

(22) Filed: Nov. 21, 2023

(65) Prior Publication Data

US 2024/0171845 A1    May 23, 2024

Related U.S. Application Data

(60) Provisional application No. 63/427,469, filed on Nov. 23, 2022.

(51) Int. Cl.
*H04N 23/61* (2023.01)
*G06T 7/246* (2017.01)
(Continued)

(52) U.S. Cl.
CPC ............ *H04N 23/61* (2023.01); *G06T 7/248* (2017.01); *G06T 7/292* (2017.01); *G06T 7/74* (2017.01);
(Continued)

(58) Field of Classification Search
CPC .......... G06T 2207/10016; G06T 2207/10032; G06T 2207/20081; G06T 2207/20084;
(Continued)

(56) References Cited

U.S. PATENT DOCUMENTS

| | | | |
|---|---|---|---|
| 2019/0114804 A1 | 4/2019 | Sundaresan et al. | |
| 2019/0147221 A1* | 5/2019 | Grabner | G06T 7/75 |
| | | | 382/103 |
| 2020/0302634 A1* | 9/2020 | Pollefeys | G06T 7/70 |
| 2021/0090284 A1* | 3/2021 | Ning | G06V 10/82 |
| 2021/0150251 A1 | 5/2021 | Chen et al. | |
| 2022/0076018 A1 | 3/2022 | Geiss et al. | |

(Continued)

FOREIGN PATENT DOCUMENTS

CN    111 104 831 A    5/2020

OTHER PUBLICATIONS

European Extended Search Report and Written Opinion received from The Hague dated Apr. 8, 2024 in corresponding patent application No. 23211625.1-1207 mailed Apr. 23, 2024.
(Continued)

*Primary Examiner* — Amy R Hsu
(74) *Attorney, Agent, or Firm* — The Marbury Law Group, PLLC

(57) ABSTRACT

The system and methods of the various embodiments enable better capturing of images of objects that are moving relative to a camera. A computing system may be configured to capture a frame containing a target object, generate at least two candidate object bounding boxes for the target object, and determine a candidate object feature vector for the part of the frame contained within each candidate object bounding box. The computing system may compute the distance between each candidate object feature vector and a target object feature vector, selecting the candidate object bounding box associated with the candidate object feature vector that is closest to the target object feature vector, generate partial image statistics on the part of the frame contained within the selected candidate object bounding box, and provide the partial image statistics as input to an AX algorithm that controls the camera.

30 Claims, 17 Drawing Sheets

(51) Int. Cl.
*G06T 7/292* (2017.01)
*G06T 7/73* (2017.01)

(52) U.S. Cl.
CPC ............... *G06T 2207/10032* (2013.01); *G06T 2207/20081* (2013.01); *G06T 2207/20084* (2013.01)

(58) Field of Classification Search
CPC ......... G06T 7/246; G06T 7/248; G06T 7/292; G06T 7/74; G06V 10/25; G06V 10/82; G06V 20/52; H04N 23/61; H04N 23/617; H04N 23/73; H04N 23/75; H04N 23/76
See application file for complete search history.

(56) References Cited

U.S. PATENT DOCUMENTS

| | | | |
|---|---|---|---|
| 2023/0032888 A1* | 2/2023 | Li | G06V 10/44 |
| 2023/0038842 A1* | 2/2023 | Yu | G06N 3/084 |
| 2023/0260251 A1* | 8/2023 | Liu | G06V 20/46 |
| | | | 382/103 |
| 2023/0368414 A1* | 11/2023 | Afrooze | G06N 3/08 |

OTHER PUBLICATIONS

Yang, et al., "Simaese Matching Network Based on Robust Feature Representation for Object Tracking", 2019 12th International Congress on Image and Signal Processing, Biomedical Engineering and Informatics (CISP-BMEI), IEEE, XP033693425, pp. 1-6, (Oct. 19, 2019).

* cited by examiner

SYSTEM AND METHOD FOR CAPTURING IMAGES OF OBJECTS THAT ARE MOVING RELATIVE TO A CAMERA

RELATED APPLICATIONS

This application claims the benefit of priority to U.S. Provisional Application No. 63/427,469, titled "System and Method for Capturing Images of Objects that are Moving Relative to a Camera" filed Nov. 23, 2022, the entire contents of which are hereby incorporated by reference for all purposes.

BACKGROUND

The ability to capture better images of objects that are moving relative to a camera has been studied extensively in the field of computer vision. Capturing better images generally involves performing some level of object tracking to extract information from a series of image frames such that the location of the object of interest is determined in each of the image frames. Conventional computer vision techniques for object tracking include methods such as background subtraction, optical flow, and template matching.

By tracking an object in a camera field of view, the pixels associated with the object may be approximated. Knowing the intensities of these pixels may be useful for generating statistics for input into automated algorithms (e.g., auto exposure, auto focus, auto white balance, auto noise reduction), referred to as "AX" algorithms. Controlling these AX algorithms dynamically based on statistics of an object of interest enables real-time image and video generation that is optimized for viewing the object.

This may be particularly useful in cases such as satellite separation (also referred to as "deployment" and "dispensing") in space, where the scene is generally uncluttered but where it is important that as much detail as possible be resolved on the object of interest (i.e., the satellite) in the scene. Determining the correct exposure, focus, white balance, and noise reduction settings at capture time is important for increasing the resolvable and useful image detail that is retained in the processed image frames. Incorrect AX settings cannot be fully compensated for post-capture (e.g. because it is not feasible to capture RAW images), and therefore AX control is a dynamic and real-time process.

SUMMARY

Various aspects include methods of capturing images of objects that are moving relative to a camera. The method may include capturing, using a camera, a frame containing a target object, generating at least two candidate object bounding boxes for the target object in the captured frame using a previously generated bounding box, determining a candidate object feature vector for a part of the frame contained within each candidate object bounding box by using a neural network to perform inference on the part of the frame contained within the candidate object bounding box, computing the distance between each candidate object feature vector and a target object feature vector, selecting the candidate object bounding box associated with the candidate object feature vector that may be closest to the target object feature vector, generating partial image statistics on the part of the frame contained within the selected candidate object bounding box, and providing the partial image statistics as input to an AX algorithm that controls the camera. In some aspects, capturing, using the camera, the frame containing the target object may include capturing the frame using a camera that may be controlled by an AX algorithm that uses partial image statistics from a part of a frame contained within a bounding box of a previous frame.

In some aspects, generating at least two candidate object bounding boxes for the target object in the captured frame using a previously generated bounding box may include using a kinetic model to predict the target object's location within the frame, and generating at least one candidate object bounding box containing the target object's predicted location. In some aspects, generating at least two candidate object bounding boxes for the target object in the captured frame using a previously generated bounding box may include generating at least one candidate object bounding box with a size that may be different to the size of the previously generated bounding box. In some aspects, generating at least two candidate object bounding boxes for the target object in the captured frame using a previously generated bounding box may include using a Siamese network to localize the central point of the target object, and generating at least one candidate object bounding box that may be centered on the central point of the target object.

In some aspects, determining a candidate object feature vector for the part of the frame contained within each candidate object bounding box by using a neural network to perform inference on the part of the frame contained within the candidate object bounding box may include using a fixed feature extraction neural network. In some aspects, determining a candidate object feature vector for the part of the frame contained within each candidate object bounding box by using a neural network to perform inference on the part of the frame contained within the candidate object bounding box may include using a neural network that may be partially or full retrained on the type of target objects. In some aspects, determining a candidate object feature vector for the part of the frame contained within each candidate object bounding box by using a neural network to perform inference on the part of the frame contained within the candidate object bounding box may include using parallelization to perform inference on the parts of the frame contained within at least two candidate object bounding boxes simultaneously.

In some aspects, computing the distance between each candidate object feature vector and a target object feature vector may include computing the distance between each candidate object feature vector and a target object feature vector using one or more of cosine distance, L1 norm, and L2 norm. In some aspects, computing the distance between each candidate object feature vector and a target object feature vector may include computing the distance between each candidate object feature vector and a combination of the target object feature vector and at least one previous candidate object feature vector that was closest to the target object feature vector.

In some aspects, the combination of the target object feature vector and at least one previous candidate object feature vector that was closest to the target object feature vector may include adjusting the weighting of the contribution of the target object feature vector based upon the frame sequence number.

In some aspects, generating partial image statistics on the part of the frame contained within the selected candidate object bounding box may include generating partial image statistics on the part of the frame contained within the selected candidate object bounding box of a previous frame.

In some aspects, generating partial image statistics on the part of the frame contained within the selected candidate object bounding box may include using a neural network to create a mask that covers the background pixels in the part of the frame contained within the selected candidate object bounding box, and generating partial image statistics on the unmasked pixels in the part of the frame contained within the selected candidate object bounding box. In some aspects, providing the partial image statistics as input to an AX algorithm that controls the camera may include providing the partial image statistics as input to an algorithm for one or more of controlling the auto exposure of the camera, controlling the auto focus of the camera, controlling the auto white balance of the camera, and controlling the auto noise reduction of the camera.

Some aspects may further include generating and selecting a second candidate object bounding box for a second target object in the captured frame, and generating partial image statistics on the parts of the frame contained within the selected first and second candidate object bounding boxes. Some aspects may further include receiving, in a second camera, a target object feature vector from the first camera, capturing a frame containing the target object using the second camera, generating at least two candidate object bounding boxes for the target object in the captured frame using a previously generated bounding box, determining a candidate object feature vector for the part of the frame contained within each candidate object bounding box by using a neural network to perform inference on the part of the frame contained within the candidate object bounding box, and computing the distance between each candidate object feature vector and the received target object feature vector.

Further aspects may include a computing device having a processor configured with processor-executable instructions to perform various operations corresponding to the methods discussed above.

Further aspects may include a computing device having various means for performing functions corresponding to the method operations discussed above.

Further aspects may include a non-transitory processor-readable storage medium having stored thereon processor-executable instructions configured to cause a processor to perform various operations corresponding to the method operations discussed above.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DESCRIPTION

Figure 1A:
FIG. 1A is an illustration of three exemplary exposure variations of a single image of a koala.
Figure 1A:
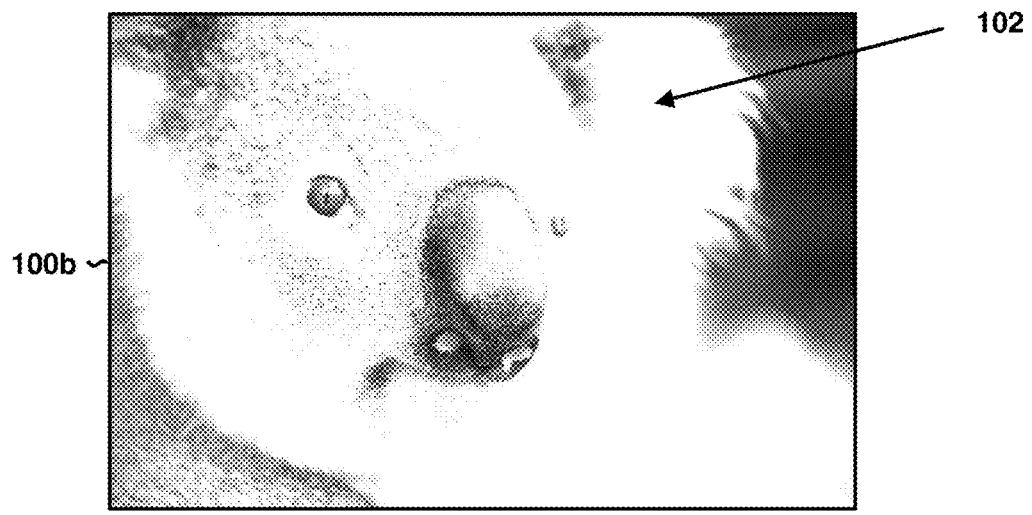
Figure 1A:
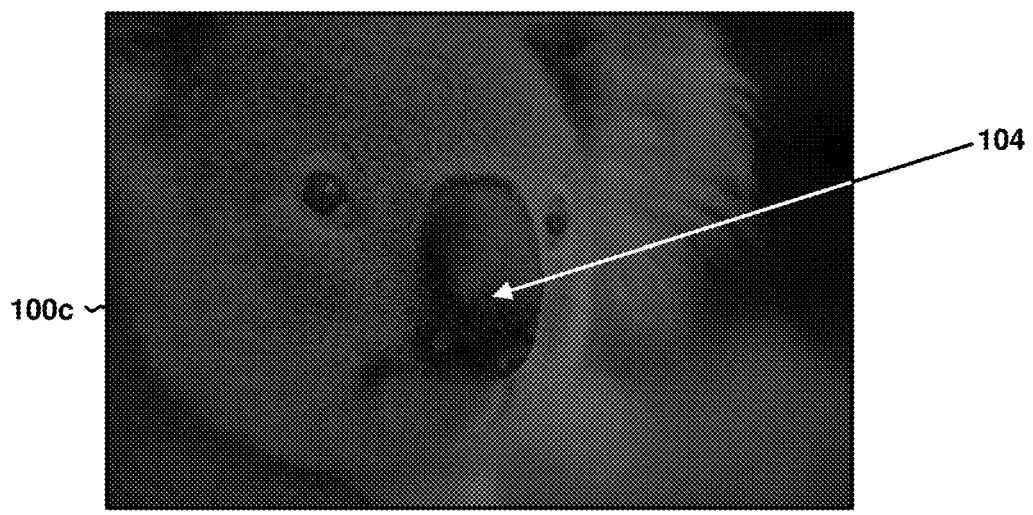

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In overview, the embodiments include methods, and processing systems or computing devices configured to implement the methods, of capturing images of objects that are moving relative to a camera, which may include capturing, using a camera, a frame containing a target object, generating at least two candidate object bounding boxes for the target object in the captured frame using a previously generated bounding box, determining a candidate object feature vector for a part of the frame contained within each candidate object bounding box by using a neural network to perform inference on the part of the frame contained within the candidate object bounding box, computing the distance between each candidate object feature vector and a target object feature vector, selecting the candidate object bounding box associated with the candidate object feature vector that is closest to the target object feature vector, generating partial image statistics on the part of the frame contained within the selected candidate object bounding box, and providing the partial image statistics as input to an AX algorithm that controls the camera.

The word "exemplary" is used herein to mean "serving as an example, instance, or illustration." Any implementation described herein as "exemplary" is not necessarily to be construed as preferred or advantageous over other implementations.

The term "computing device" may be used herein to refer to any one or all of server computing devices, personal computers, laptop computers, tablet computers, edge devices, user equipment (UE), multimedia Internet enabled cellular telephones, smartphones, drones (subterranean, aquatic, terranean, aerial), smart wearable devices (e.g., smartwatch, smart glasses, fitness tracker, clothes, jewelry, shoes, etc.), Internet-of-Things (IoT) devices (e.g., smart televisions, smart speakers, smart locks, lighting systems, smart switches, smart doorbell cameras or security systems, etc.), connected vehicles, launch vehicles, satellites (e.g., cube satellites (CubeSats), etc.), high-altitude pseudo-satellites (HAPS), spacecraft, space rovers, submarines, submersible vehicles, and other similar devices that include a memory and programmable processor for providing the functionality described herein.

The term "processing system" is used herein to refer to one or more processors, including multi-core processors, that are organized and/or configured to perform various computing functions and/or to provide the functionality described herein. Various embodiment methods may be implemented in one or more of multiple processors within a processing system as described herein. As such, a computing device tasked with enacting the functionalities described herein may include a processing system with one or multiple processors. The computing device may be a standalone entity or a component of a system-on-chip (SoC).

The term "AI model" may be used herein to refer to a wide variety of information structures that may be used by a computing device to perform a computation or evaluate a specific condition, feature, factor, dataset, or behavior on a device. Examples of AI models include network models, neural network models, inference models, neuron models, classifiers, random forest models, spiking neural network (SNN) models, convolutional neural network (CNN) models, recurrent neural network (RNN) models, deep neural network (DNN) models, generative network models, and genetic algorithm models. In some embodiments, an AI model may include an architectural definition (e.g., the neural network architecture, etc.) and one or more weights (e.g., neural network weights, etc.).

The terms "image" and "frame" may both be used herein to refer to visual data acquired by a camera device. An image may include a multitude of color channels and pixels.

The term "region of interest" (ROI) is used herein to refer to a subset of an image or frame that has a particular significance in a given context. The region of interest may be empty, and it may be equal to the full frame.

The term "AX" may be used herein to refer to any automated feature associated with capturing an image using a camera (e.g., auto exposure, auto focus, auto white balance, auto noise reduction). Their associated algorithms are referred to as "AX algorithms". The term "auto" may refer to the ability of these algorithms to appropriately update an image sensor and/or image signal processor settings without user input.

The term "neural network" may be used herein to refer to an interconnected group of processing nodes (or neuron models) that collectively operate as a software application or process that controls a function of a computing device and/or generates an overall inference result as output. Individual nodes in a neural network may attempt to emulate biological neurons by receiving input data, performing simple operations on the input data to generate output data, and passing the output data (also called "activation") to the next node in the network. Each node may be associated with a weight value that defines or governs the relationship between input data and output data. A neural network may learn to perform new tasks over time by adjusting these weight values. In some cases, the overall structure of the neural network and/or the operations of the processing nodes do not change as the neural network learns a task. Rather, learning is accomplished during a "training" process in which the values of the weights in each layer are determined. As an example, the training process may include causing the neural network to process a task for which an expected/desired output is known, comparing the activations generated by the neural network to the expected/desired output, and determining the values of the weights in each layer based on the comparison results. After the training process is complete, the neural network may begin "inference" to process a new task with the determined weights.

The term "inference" may be used herein to refer to a process that is performed at runtime or during execution of the software application program corresponding to the neural network. Inference may include traversing the processing nodes in the neural network along a forward path to produce one or more values as an overall activation or overall "inference result".

The term "classifier" may be used herein to refer to an AI model and/or information structures that may be used by a device processor to evaluate collected data or a specific feature (or factor, condition, data point, operation, component, etc.). For example, a classifier may include decision nodes (e.g., neural networks, decision stumps, boosted decision trees, etc.) that each include a weight value and a test question/condition suitable for evaluating the collected data.

The term "deep neural network" may be used herein to refer to a neural network that implements a layered architecture in which the output/activation of a first layer of nodes becomes an input to a second layer of nodes, the output/activation of a second layer of nodes becomes an input to a third layer of nodes, and so on. As such, computations in a deep neural network may be distributed over a population of processing nodes that make up a computational chain. Deep neural networks may also include activation functions and sub-functions between the layers. The first layer of nodes of a multilayered or deep neural network may be referred to as an input layer. The final layer of nodes may be referred to as an output layer. The layers in-between the input and final layer may be referred to as intermediate layers.

The term "convolutional neural network" (CNN) may be used herein to refer to a deep neural network in which the computation in at least one layer is structured as a convolution. A convolutional neural network may also include multiple convolution-based layers, which allows the neural network to employ a very deep hierarchy of layers. In convolutional neural networks, the weighted sum for each output activation is computed based on a batch of inputs, and the same matrices of weights (called "filters") are applied to every output. These networks may also implement a fixed feedforward structure in which all the processing nodes that make up a computational chain are used to process every task, regardless of the inputs. In such feed-forward neural networks, all of the computations are performed as a sequence of operations on the outputs of a previous layer. The final set of operations generate the overall inference result of the neural network, such as a probability that an image contains a specific object (e.g., a person, cat, watch, edge, etc.) or information indicating that a proposed action should be taken.

CNNs have increasingly become an important part of many computer vision applications. State-of-the-art machine learning methods are mainly based on CNNs due to their impressive performance and ability to generalize. CNNs have begun to displace traditional handcrafted features-based methods, in part because they are capable of automatically learning how to compute the necessary features for a specific task. These and other features have made CNNs especially well-suited for solving classification, object detection, segmentation, and natural language processing problems.

Notwithstanding the good performance of CNNs, they are known for their "data hungriness". That is, a CNN may require thousands of images to learn millions of parameters. Data collection and labeling may be the most time-consuming parts of the CNN training process, often consuming up to 80% of the entire solution development effort. To overcome this, transfer learning techniques may be used to fine-tune pre-trained neural networks on new datasets. In this regard, it is possible to use smaller datasets to train a CNN model if it is initialized with the weights learned for another task.

Depending on the ability of the pre-trained neural network to generalize to other tasks, the new model may require more or less data in order to be trained. However, there are tasks for which collecting data to train a CNN is either extremely difficult or is not possible at all. These tasks might be addressed using traditional computer vision methods. Yet, it may be cumbersome or technically challenging to take advantage of the state-of-the-art neural network-based methods when using traditional computer vision methods.

Object tracking is a task for which it is sometimes not possible to know beforehand what the object to be tracked will look like. This is because it may not be possible to acquire images, or a sufficient number of images, before the application is deployed. A typical application where this is the case occurs when trying to capture images of satellite separation in space. It may not be feasible or possible to collect sample images from payload launches in space until they happen. Further, each space mission is very expensive. Another application for which it may not be possible to know beforehand what a tracked object will look like relates to military unmanned aerial vehicles (e.g., drones) trying to capture images of previously unseen enemy military vehicles (e.g., land based vehicles, water based vehicles, other unmanned aerial vehicles).

Image signal processing is the process of conditioning a raw image frame captured from a sensor such that the processed version of the frame is in some way enhanced relative to the raw frame based on some user-defined criteria. For example, the image signal processor may be designed to reduce noise in the image, or to enhance the image colors to reflect the scene colors more faithfully as seen by a human observer, or to increase the sharpness of the image. The image signal processor is typically implemented in an image signal processor pipeline, where one or more stages in the pipeline each perform a different task. For example, one stage might debayer a raw image to produce an image in RGB format, while another stage might apply white balancing to the RGB image. In many cases, it is desired to implement the image signal processor at a framerate such that the rate at which the sensor produces raw images (i.e., the frames per second (FPS)) is the same as the rate at which the image signal processor processes the raw images, and the latency of the image signal processor is such that a frame may be processed in (1/FPS) seconds. This may require that some or all of the image signal processor be implemented on dedicated hardware, such as on an image signal processor. This image signal processor is often co-located with the image sensor (i.e., within the camera unit).

When an image sensor captures a frame, the appearance of that frame is affected by many factors. The goal of AX processes (e.g., auto exposure, auto focus, auto white balance, and auto noise reduction processes) is to configure the image sensor such that the frame it captures retains the maximum amount of useful scene information while faithfully representing that information in the output image. Control of the AX processes is often performed by an AX algorithm that uses a combination of the image signal processor and the image sensor control software.

Auto exposure control for a digital image sensor may be the control of the integration time of the pixel elements on the sensor in order to determine the optimum amount of light to gather to produce a faithful and well-exposed output frame. The physics of image sensors (e.g., CCD and CMOS sensors) means that there are limits on the range of photons that may be captured by a pixel element. The minimum number of photons that will register in the output frame may be dependent on the noise floor and the sensitivity of the pixel element (i.e., the quantum efficiency). The maximum number of photons that may be captured by the pixel element before pixel well overflow may be determined by the well depth. The goal of auto exposure may be to automatically control the duration during which pixel elements collect photons on a frame level. Correct auto exposure may reduce or minimize saturation and blooming (i.e., pixel well overflow resulting in saturation) and attempt to maximally use the dynamic range of the pixel elements by optimally mapping the scene dynamic range to the sensor dynamic range at a frame level.

FIG. 1A is an illustration of three exemplary exposure variations 100a, 100b, 100c of a single image of a koala (copyright Angelo Giordano, https://pixabay.com/photos/koala-nature-animals-legs-630117/). Image 100a is correctly exposed to the extent that it is possible to identify details in both the bright and dark areas of the image. It is pleasant to the human eye, and it is also suitable for subsequently analyzing using a neural network.

Image 100b is over-exposed, and therefore detail has been lost in the brighter areas of the image (e.g., area 102). Image 100c is under-exposed, and therefore detail has been lost in the darker areas of the image (e.g., area 104). Images 100b and 100c are not as pleasant to the human eye as image 100a, and they will also give poorer results than image 100a when subsequently analyzed using a neural network.

Auto exposure control is closely related to the concept of total exposure (or total sensitivity). Total exposure is mainly affected by two controllable parameters: the exposure time and the gain. The gain may be applied in the analog domain, in the digital domain, or in a combination of both domains. Total exposure may be defined as the exposure time multiplied by the gain. This product determines the overall pixel brightness in the output image. In order to reduce noise, it is often desirable to prioritize exposure time over gain when automatically determining the total exposure and to keep the gain as close to one as possible. This reduces the amplification of sensor noise.

Auto exposure control may also involve varying the aperture in cases where there are optical elements with a variable aperture in front of the image sensor.

Autofocus is the process of automatically determining the optimal focus of the optical elements in front of the image sensor that captures light from the scene and directs it to the pixel elements on the sensor. Cameras with fixed-focus lenses do not use autofocus. Misfocused, or out of focus, regions of a captured frame are effectively low-pass filtered versions of the scene, and therefore autofocus has the goal of retaining as much of the scene information as possible for the full frame, or for a subset of the full frame (e.g., for the object "in-focus"), by reducing out-of-focus blur.

Auto white balance is the task of automatically determining the color balance to apply to a frame captured from the sensor, in order to improve color correctness in the output frame. The color balance is adjusted in a post-processing step after frame capture and it is typically based on a statistical analysis of the color content of the frame and on pre-calibrated color balance configurations that cover a range of potential illumination source color temperatures (e.g., tungsten, fluorescent, incandescent). The auto-white balance process estimates the color temperature of the illumination source and subsequently adjusts the color balance appropriately.

Auto noise reduction, which has the task of determining the optimum image signal processor parameters for the noise reduction filters, is another method of controlling overall noise in the output image. These noise reduction parameters may be determined automatically by analysis of statistics for regions of interest in an image.

The AX algorithms are typically driven by image content (i.e., some statistics that are extracted from a frame or set of frames). The entire frame may be considered as part of an AX algorithm if the entire frame is of interest. Alternatively, a region of interest in the frame may be considered as part of an AX algorithm if the region is of particular interest (e.g., consumer phones and cameras will normally prioritize regions of interest containing human faces).

The statistics may be the average intensity of all the pixels in a given region of interest in the frame, the percentage of pixels with intensities above/below/between configurable thresholds, the mean sharpness in the region of interest, the mean color balance point in the region of interest. More than one region of interest may be used from a single frame, and regions of interest may be used across multiple frames.

Defining the regions of interest statically, such that they are in fixed locations for a given set of images, and where those locations are independent of the scene/frame content, is one approach. However, such an approach may not work well when there are particular objects in the scene/frame that are of interest to the end application. In this case, unless the regions of interest are aligned to the object, and unless they maintain alignment over time with the objects, the AX algorithms may generate control signals that may not form output frames for which the object is correctly represented (e.g., the exposure, focus, white balance, or noise reduction may not be correct). For example, in one scenario an object of interest may be overexposed if its mean pixel intensity in the controlling frame is significantly higher than the mean pixel intensity of the region of interest being used. The opposite may also be the case, where the object may be underexposed if the mean intensity of the region of interest is greater than the mean intensity of the object. In this case, information on the object will also be lost due to intensity compression and reduced Signal to Noise Ratio (SNR).

Some of the embodiments and methods described herein may be applied to AX tasks (e.g., auto exposure, auto focus, auto white balance, auto noise reduction) in which an object, group of objects, class of objects, or classes of objects are known, a-priori, to be of interest in the output processed frames. In this case, the inputs to the AX algorithms, and the AX algorithms themselves, may be tailored to the object, set of objects, class of objects, or classes of objects. This has applications in cases where the quality and faithful representation of the object of interest in the output (i.e., image signal processor processed) image is of paramount interest, but where that object is not static relative to the sensor image capturing the scene.

Figure 1B:
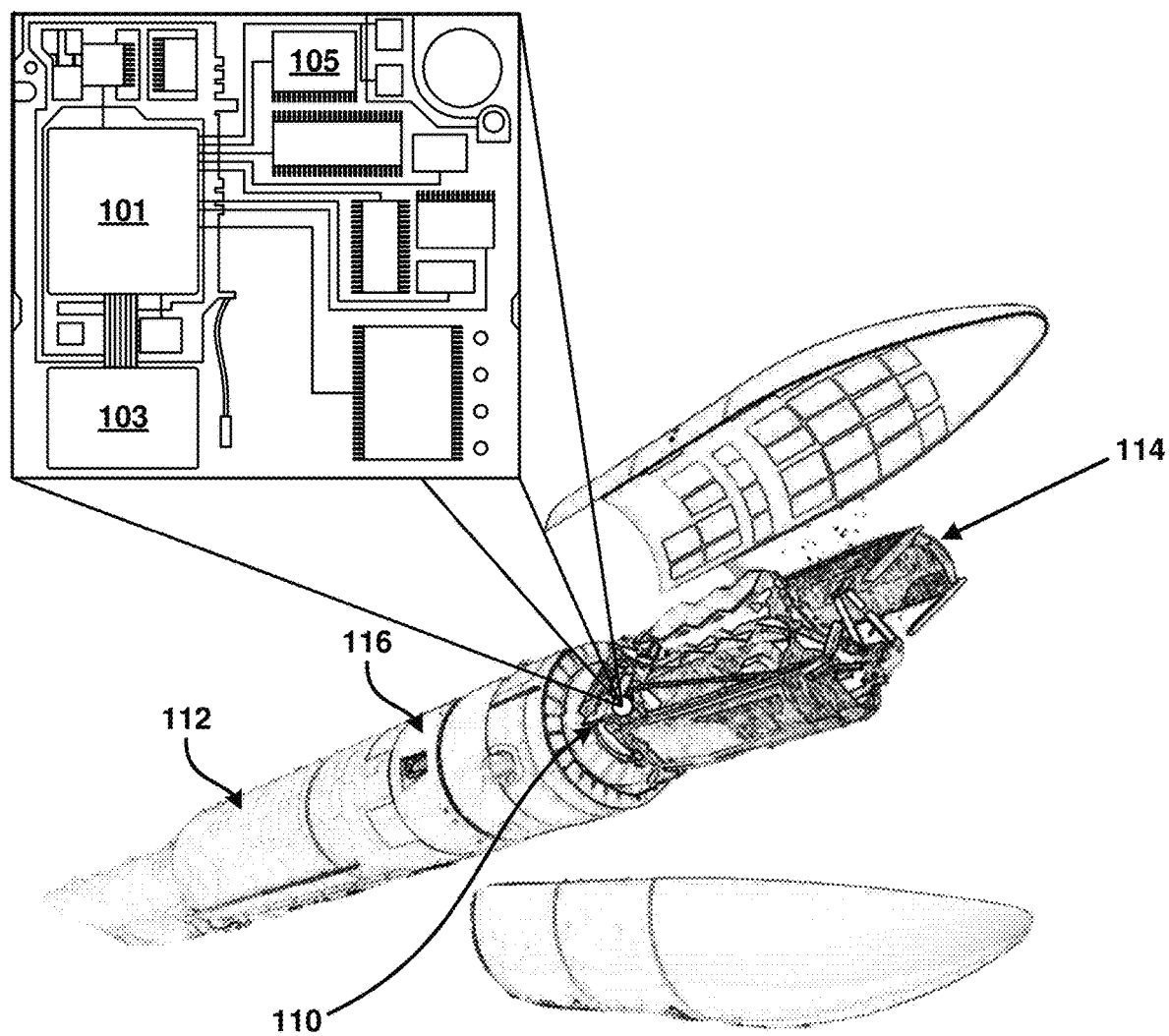
FIG. 1B is an illustration of a space launcher with an externally mounted monitoring camera and processors that could be configured in accordance with the various embodiments.

FIG. 1B illustrates an example application of monitoring cameras 110, 116 mounted on a space launcher 112. The launcher has the task of delivering into orbit a payload consisting of one or more satellites 114. The monitoring camera 110 may be used to visually monitor, in real-time (but also with the option of post analysis), the satellite deployment from the launch vehicle dispenser 112. The purpose of the analysis is to confirm correct deployment and to visually monitor the health and activity of the dispensed satellite (e.g., detumbling). Due to the well-defined structure of the environment into which the satellite is launched (i.e., substantially empty space), the scene captured by the monitoring camera has a known set of information in it. Specifically, the captured scene may contain some or all of the following: part of the launcher, part or all of the dispensing system, one or more satellites, stars, other astronomical bodies such as the Earth, dirt, dust, etc.

In the example illustrated in FIG. 1B, the space launcher 112 and/or each of one or more satellites 114 includes a processor 101 coupled to a memory 103, which may include a volatile memory and/or a large capacity nonvolatile memory. The satellite 114 may also include network access ports or transceivers 105 coupled to the processor 101 for establishing data connections with a network and/or otherwise sending and receiving information.

The processor 101 may be any programmable microprocessor, microcomputer or multiple processor chip or chips that may be configured by software instructions (applications) to perform a variety of functions, including the functions of the various embodiments described below. Multiple processors 101 may be provided, such as one processor dedicated to wireless communication functions, one processor dedicated to image processing functions, and one processor dedicated to running other applications. Typically, software applications may be stored in the internal memory 103 before they are accessed and loaded into the processor 101. The processor 101 may include internal memory sufficient to store the application software instructions.

Figure 1C:
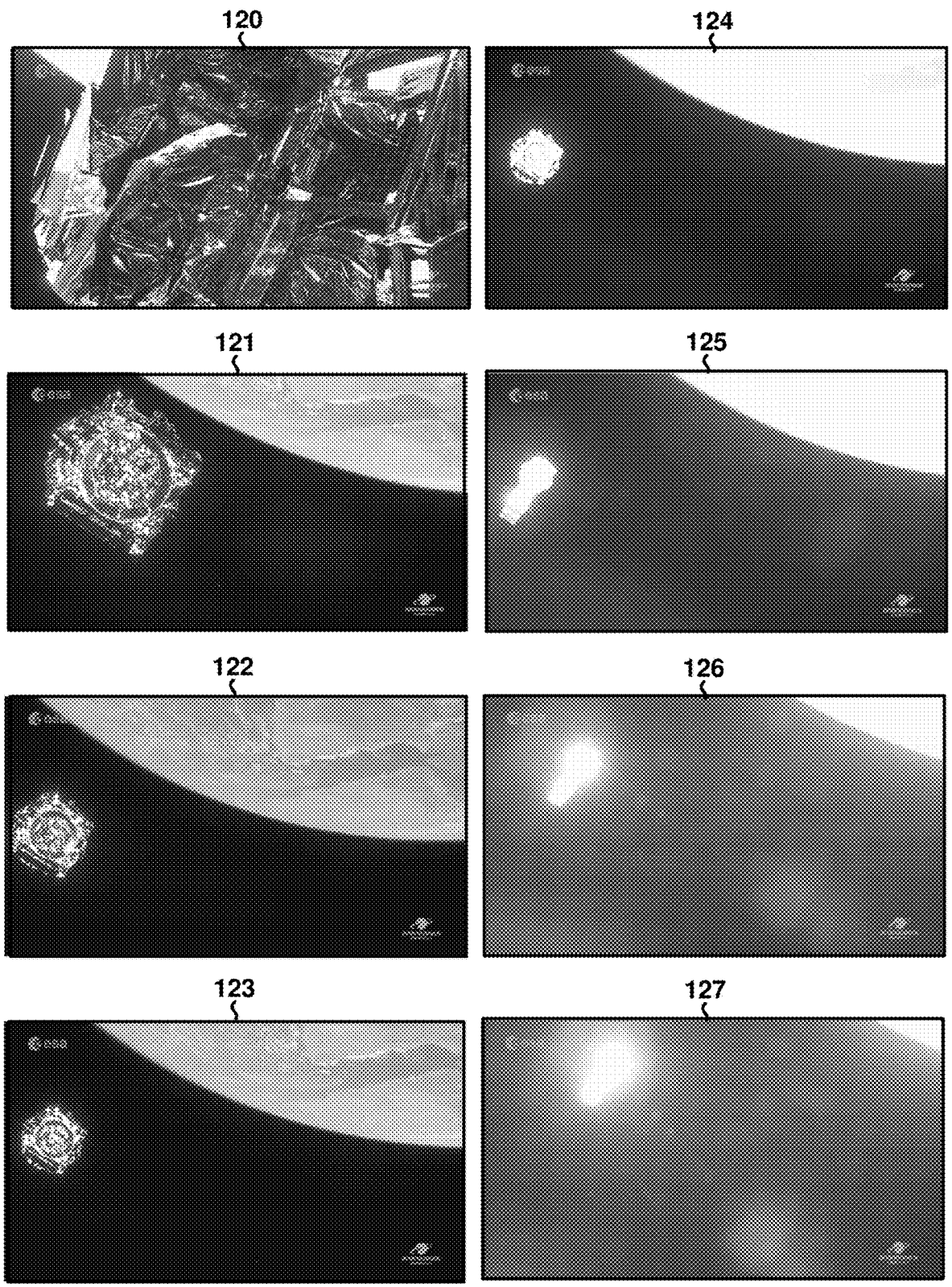
FIGS. 1C-1F are illustrations of exemplary frames captured in sequence in accordance with some embodiments.

FIG. 1C illustrates eight frames 120-127 successively taken of a payload being placed in orbit from a camera that is mounted on the launch rocket (e.g., camera 110 on launcher 112 with reference to FIG. 1B). (The images are based upon ESA video of the separation of the James Webb Space Telescope from the Ariane 5 launch vehicle, available at https://www.esa.int/ESA_Multimedia/Videos/2021/12/Webb_separation_from_Ariane_5). The AX algorithms being used to generate these frames are operating on the entire frames rather than a region of interest within the frame. Taking exposure as an example, these frames illustrate the difficulty of exposing an image correctly when it contains mostly regions of extreme brightness and extreme darkness. It may be seen that the initial frames 120-123 are exposed correctly (e.g., there are details in the satellite, there are details on Earth, and there is no detail in space (as expected since it is a void)). However, the exposure in the latter frames (e.g., 124-127) becomes progressively worse as the AX algorithm tries to expose the entire image correctly. This results in the satellite being overexposed to the extent that it is simply a white blob, the earth being overexposed to the extent that it is pure white, and space being brightened to the extent that it has become grey. The satellite is the only feature of interest in these frames (i.e., there are no motivations for trying to see any details of the Earth or space parts of these frames), and thus frames 124-127 have little value (e.g., it is nearly impossible to visually determine whether the solar array deployed correctly in frame 127).

It is also worth noting that the view of the satellite is changing across the frames 120-127 (e.g., its relative position is changing, its orientation and perspective is changing, and its shape is changing as it deploys its solar array).

Object tracking may include following a target object as it moves from a specific location in a frame to other locations in subsequent frames (e.g., as part of a sequence of frames or a video). In other words, object tracking is the task of automatically detecting the trajectory of objects across frames. Object tracking may involve object detection, where the object is detected and classified. The target object is often marked with a surrounding bounding box (e.g., a rectangle).

Figure 1D:
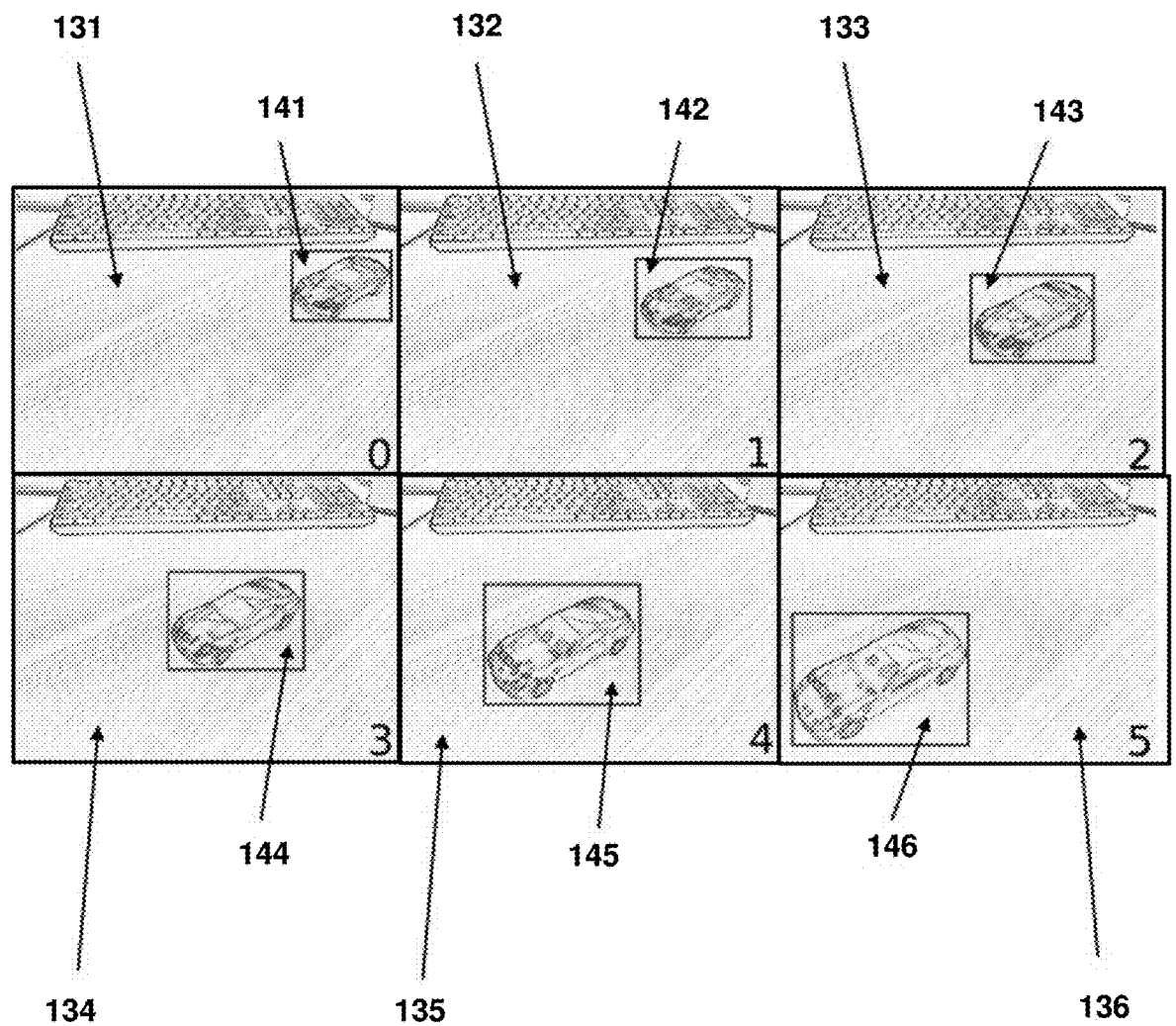

FIG. 1D is an illustration of six exemplary frames 131-136 of a toy car that is moving in front of a computer keyboard captured in sequence by an embodiment. The target object (i.e., the toy car) is surrounded by a bounding box in each frame (e.g., bounding box 141 in frame 131, bounding box 142 in frame 132, etc.).

Figure 1E:
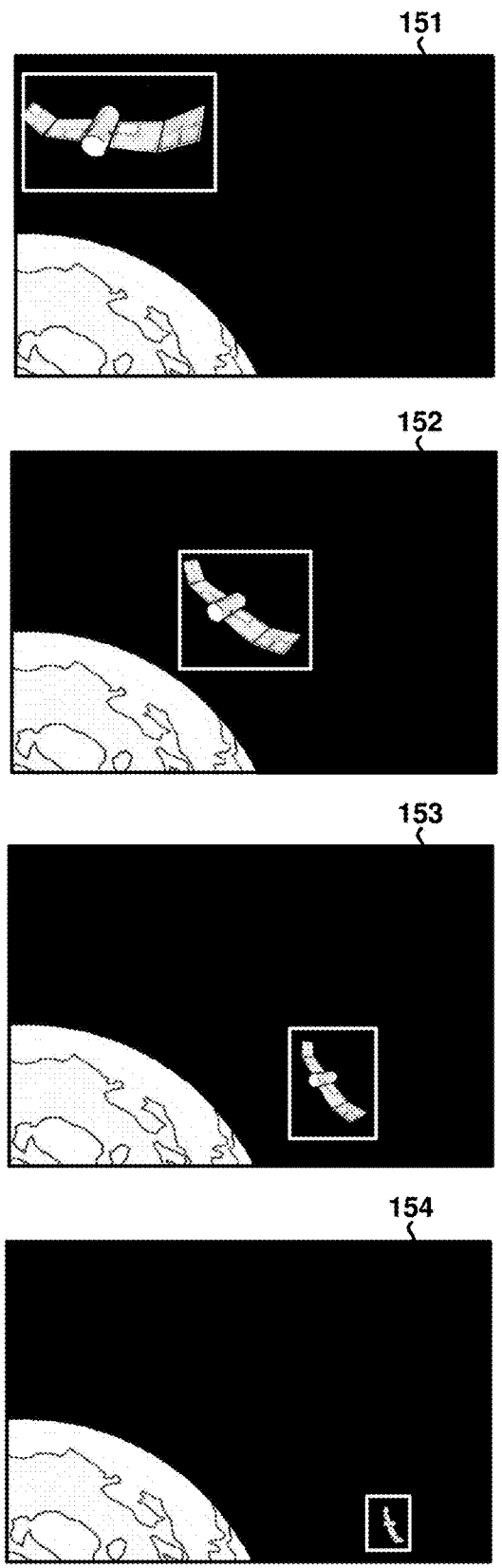

FIG. 1E is an illustration of four exemplary frames 151-154 of a satellite that is orbiting Earth captured in sequence by an embodiment. The target object (i.e., the satellite) is surrounded by a bounding box in each frame. The illustrated satellite is changing position, orientation, and perspective across frames 151-154.

In various embodiments, one satellite may need to use images of a second satellite in order to identify it and successfully connect to it (e.g., a tug satellite may need to connect to another satellite in order to adjust its orbit, a refueling satellite may need to connect to another satellite to supply it with additional liquid fuel).

In another embodiment, a camera may be mounted on a launch rocket (e.g., camera 116 on launcher 112 with reference to FIG. 1B) so that it can capture images and/or video of the booster rocket separation after launch.

Figure 1F:
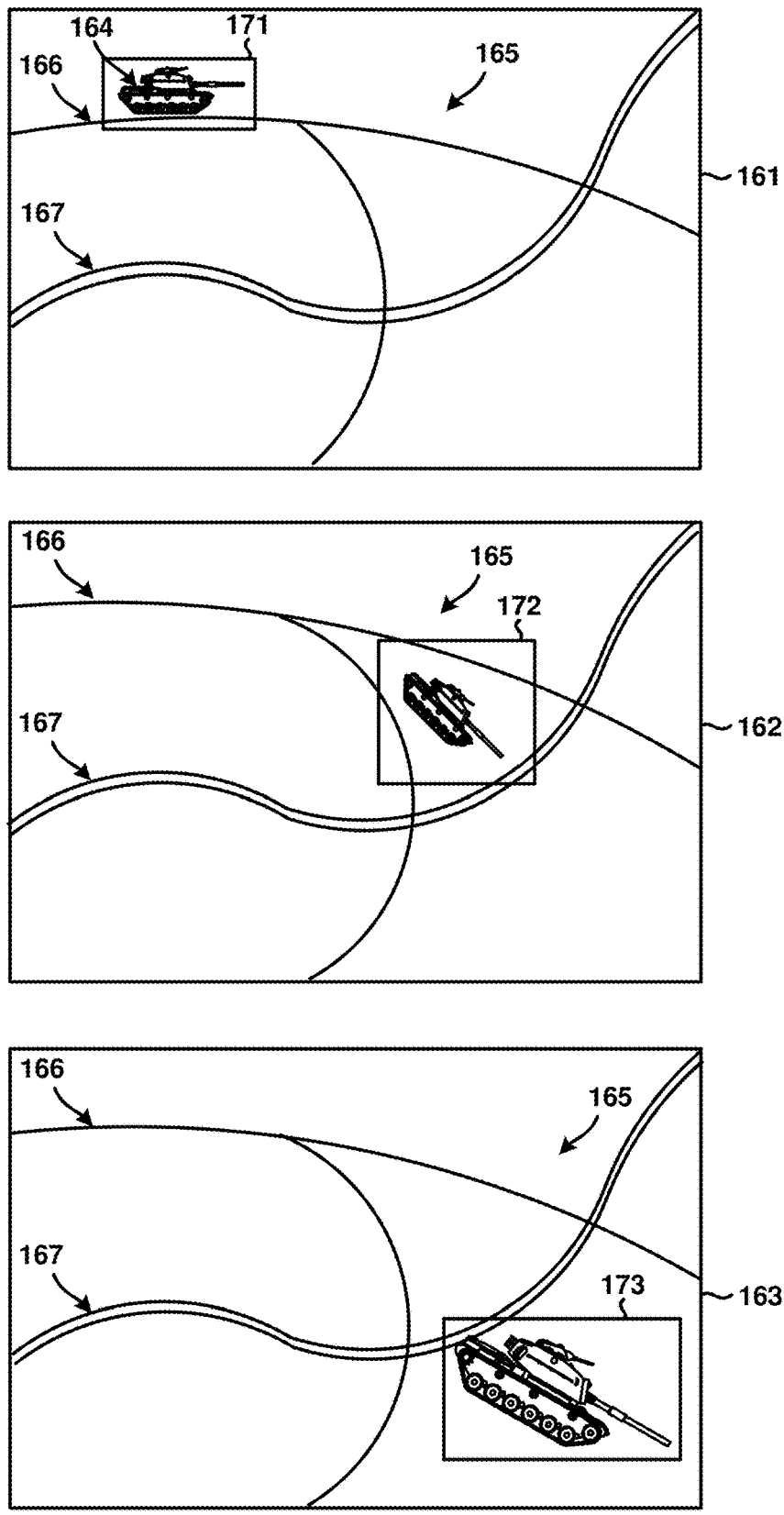

FIG. 1F is an illustration of three exemplary frames 161-163 of a military vehicle 164 driving across terrain captured in sequence by an embodiment within a drone or satellite. The terrain 165 contains a road 166 and a river 167. The target object (i.e., the military vehicle 164) is surrounded by a bounding box 171-173 in each frame (e.g., bounding box 171 in frame 161, bounding box 172 in frame 162, etc.). Military vehicle 164 changes position, orientation, and perspective as it travels across the terrain in successive frames.

The various methods described herein perform object tracking in order to provide input into the AX algorithms used by the camera (e.g., the image signal processor, the image sensor). These methods may use neural networks without needing to perform any training (i.e., the methods can use fixed feature extraction neural networks), and without requiring the generation of hand-crafted features for each deployment. Therefore, these methods do not require the gathering of image datasets of the objects that will be tracked. This is extremely important when embodiments of the methods need to be deployed into unknown or unexpected environments, or when the cost of gathering the amount of data required to train a neural network is exorbitant.

Figure 2:
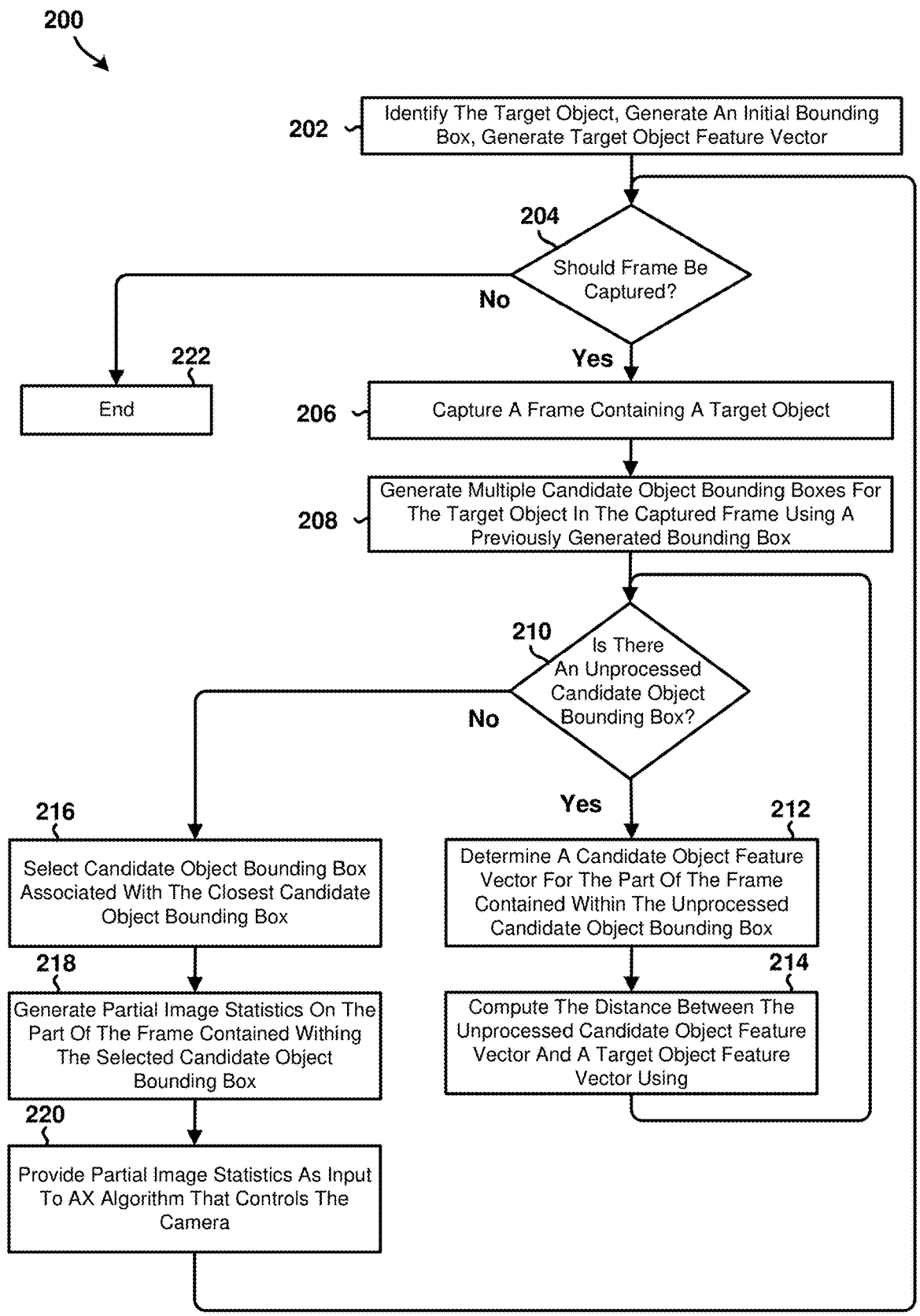
FIG. 2 is a process flow diagram illustrating a method of capturing better images of objects that are moving relative to a camera in accordance with some embodiments.

FIG. 2 is a process flow diagram illustrating a method 200 of capturing better images of objects that are moving relative to a camera. Method 200 may be performed by a processor in a computing device.

In block 202, the processor may identify the target object and it may generate an initial bounding box. In some embodiments, it may be assumed that the initial location of the target object is already known (e.g., because the target object occupies all the image, because the target object is always initially located in the same location within the image). In these situations, it may be possible to skip the initial target object detection step.

In other embodiments, the initialization of the target object's initial bounding box may be performed via a manual process (e.g., by a user drawing a bounding box on the initial frame using a graphical user interface (GUI), by a user specifying directly the bounding box corners). The bounding box may also be a shape other than a rectangle (e.g., a quadrilateral, a general polygon, a spline, a general freeform shape specified by a set of boundary points).

In other embodiments, the initial location of the target object may be determined by an object localization method (e.g., a computer vision technique involving template matching) or a CNN solution (e.g., an object detector).

With reference to FIG. 1D, the initial frame 131 contains the initial bounding box 141 which contains the target object (i.e., the toy car).

As part of block 202, the processor may also extract the features of the target object and generate a target object feature vector.

Once the target object is initially located in the starting frame of a sequence of frames or of a video sequence, the method may use the initial bounding box and the target object feature vector to localize the target object in the following frame. This is possible without having to train a specific neural network model for the particular type of target object due to the use of transfer learning and using pre-trained CNNs.

Classification CNN architectures may include two parts: (1) a feature extraction part; and (2) a classification part. When a pre-trained CNN model that was trained for a first task is used to train a model for a second task using a transfer learning process, the pre-trained CNN model's feature extraction part is often frozen so that only its classification part is updated. Pre-trained CNN models have been demonstrated to be good feature extractors. This is particularly the case of CNNs that have been trained to classify images into a large number of categories (e.g., CNN models trained with the ImageNet dataset are known to generalize very well to other tasks). Therefore, in some embodiments, the method 200 may use a pre-trained CNN model to extract the features of the target object and generate a target object feature vector.

Locating the target object in the following frame may then become a task of finding the part of the frame that shares the most features with the target object. Since the features of the target object may be affected by environmental changes (e.g., its illumination, its position), the method 200 may use the distance between the target object feature vector and the candidate object feature vector (each calculated from its associated bounding box), to determine whether the candidate object is associated with the target object.

In block 204, the processor may determine whether a frame should be captured (e.g., based upon the state of the camera, a camera controller).

In response to determining that a frame should be captured (i.e., determination block 204="Yes"), in block 206 a camera may capture a frame containing a target object. As part of this block, the camera (e.g., the image signal processor, the image sensor) may use image statistics or partial image statistics (e.g., generated from a previous frame) as input to an AX algorithm that controls the camera. This will be described further in block 220.

In block 208, the processor may generate multiple candidate object bounding boxes for the target object in the captured frame using a previously generated bounding box. Multiple candidate object bounding boxes may be needed because a common problem with object tracking is that the objects to be tracked have different sizes and aspect ratios in different frames (e.g., due to changes in position, orientation or viewpoint of the object or camera). Therefore, the method 200 may generate a set of possible bounding box locations of the target object in the following frame and it may select the bounding box that has the closest feature vector to the target object feature vector. This will be described further in block 218.

In block 210, the processor may determine whether there is an unprocessed candidate object bounding box.

In response to determining that there is an unprocessed candidate object bounding box (i.e., determination block 210="Yes"), in block 212 a processor may determine a candidate object feature vector for the part of the frame contained within the unprocessed candidate object bounding box. As part of this block, the processor may use a neural network to perform inference.

In block 214, the processor may compute the distance between the unprocessed candidate object feature vector and a target object feature vector using any appropriate distance metric (e.g., the cosine distance, the L1 norm, the L2 norm). In an embodiment, the candidate object feature vector and the target object feature vector may or may not be normalized prior to the calculation of the distance metric.

Figure 3:
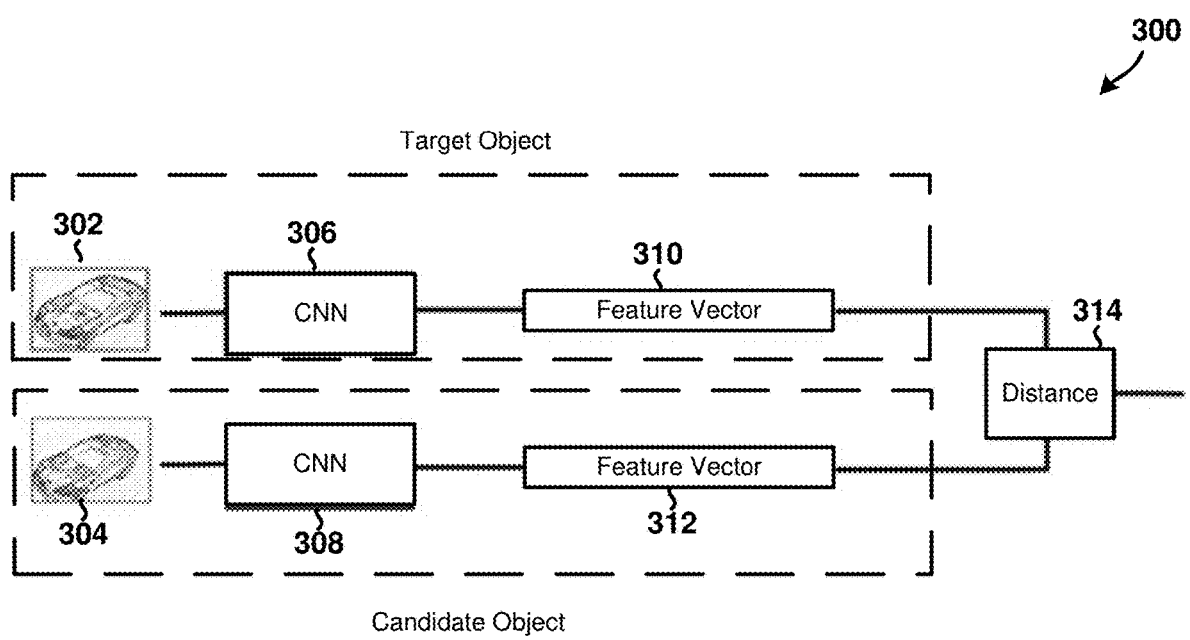
FIG. 3 is a block diagram illustrating components in a system configured to compute the distance between a target object feature vector and a candidate object feature vector in accordance with some embodiments.

FIG. 3 is a block diagram illustrating a computing system 300 configured to compute the distance between a target object feature vector and a candidate object feature vector. In block 302, the processor may identify the target object (i.e., the toy car) and its bounding box. In blocks 306 and 310, the processor may use a neural network to perform inference and determine the target object feature vector. In some embodiments, the operations in blocks 302, 306, and 310 may be performed as part of block 202 with reference to FIG. 2.

In block 304, the processor may determine a candidate object bounding box. In some embodiments, the operations in block 304 may be performed as part of block 208 with reference to FIG. 2. In blocks 308 and 312, the processor may use a neural network to perform inference and determine the candidate object feature vector. In some embodiments, the operations in blocks 308 and 312 may be performed as part of block 212 with reference to FIG. 2.

In block 314, the processor may compute the distance between the target object feature vector and the candidate object feature vector. In some embodiments, the operations in block 314 may be performed as part of block 214 with reference to FIG. 2.

Returning to FIG. 2, in response to determining that there is not an unprocessed candidate object bounding box (i.e., determination block 210="No"), the processor may compare the distances computed in block 214 for each unprocessed candidate object bounding box and select the candidate object bounding box associated with the smallest distance (i.e., the candidate object bounding box associated with the closest candidate object feature vector) in block 216.

The selected candidate object bounding box may be used to generate the candidate object bounding boxes in a subsequent frame (i.e., as part of block 208).

The various embodiments may not require that all immediately consecutive frames be processed (e.g., it may be necessary to skip certain frames in order to achieve processing optimisations, or in order to accommodate frame rates that are higher than processing rates). In such embodiments, the selected candidate object bounding box in the previous processed frame may be used to generate the candidate object bounding boxes in the current frame being processed. The current frame may be the latest frame.

Figure 4A:
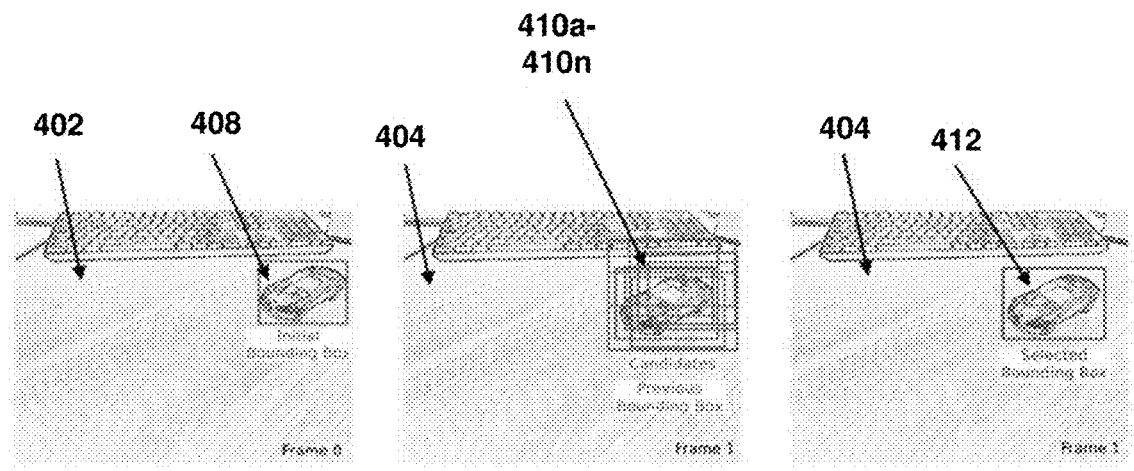
FIGS. 4A and 4B are illustrations of exemplary frames captured in sequence in accordance with some embodiments.
Figure 4B:
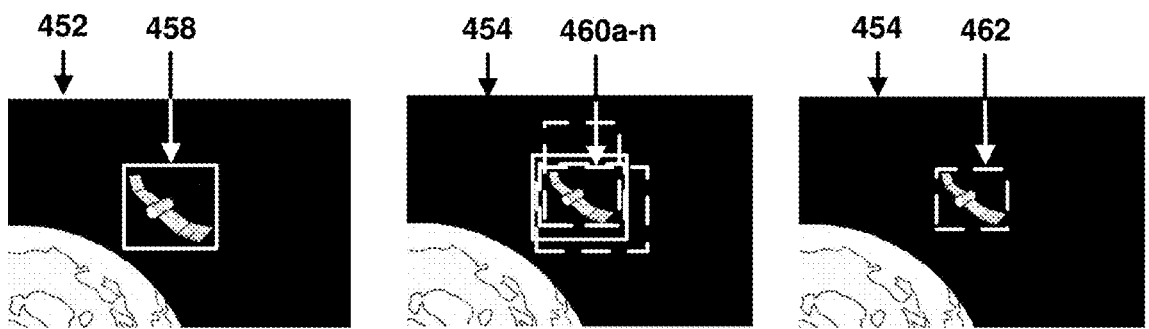
Figure 4C:
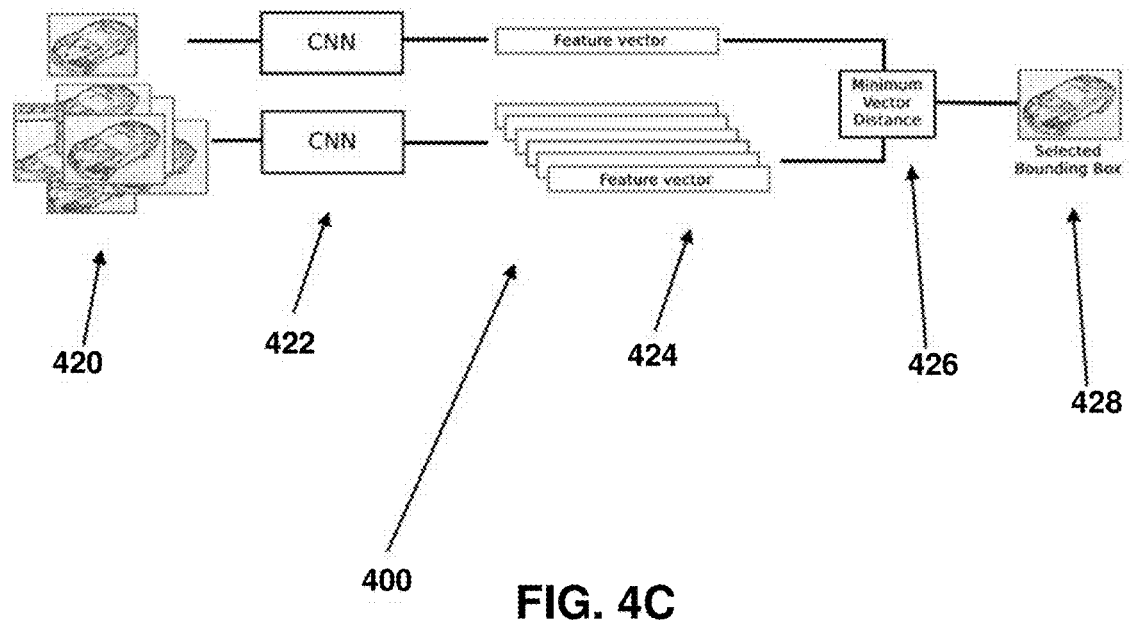
FIG. 4C is a block diagram illustrating components in a system configured to compute the distance between a target object feature vector and multiple candidate object feature vectors in the exemplary frames illustrated in FIG. 4A or FIG. 4B.

FIG. 4A and FIG. 4B are two illustrations of two exemplary frames 402, 404, and 452, 454 captured in sequence by an embodiment and an associated block diagram illustrating components in a computing system 400 configured to compute the distance between a target object feature vector and multiple candidate object feature vectors in the three exemplary frames.

The process for identifying the target object (i.e., the toy car in FIG. 4A, the satellite in FIG. 4B) and its bounding box was previously described (e.g., block 202 with reference to FIG. 2, blocks 306 and 310 with reference to FIG. 3), and therefore it is not described here again for the sake of brevity.

In block 420, the processor may determine multiple candidate object bounding boxes 410a/460a, 410b/460b, 410c/460c, etc. In some embodiments, the operations in block 420 may be performed as part of block 208 with reference to FIG. 2. In blocks 422 and 424, the processor may use a neural network to perform inference and determine the candidate object feature vector for each of the candidate object bounding boxes. In some embodiments, the operations in blocks 422 and 424 may be performed as part of block 212 with reference to FIG. 2.

In block 426, the processor may compute the distances between the target object feature vector and each candidate object feature vector. In some embodiments, the operations in block 426 may be performed as part of block 214 with reference to FIG. 2.

In block 428, the processor may compare the distances computed in block 426 for each candidate object feature vector box and select the candidate object bounding box 412/462 associated with the smallest distance (i.e., the candidate object bounding box associated with the closest candidate object feature vector). In some embodiments, the operations in block 428 may be performed as part of block 216 with reference to FIG. 2.

If the method 400 were to continue by processing a subsequent frame, then the selected candidate object bounding box 412/462 may be used to generate the candidate object bounding boxes 410a/460a, 410b/460b, 410c/460c in the subsequent frame (i.e., as part of block 420).

Returning to FIG. 2, in block 218, the processor may generate partial image statistics (e.g., minimum, maximum, and mean intensities) on the part of the frame contained within the selected candidate object bounding box (i.e., the candidate object bounding box selected in block 216). In an embodiment, the partial image statistics may be generated on the parts of the frames contained within multiple previously selected candidate object bounding boxes (i.e., temporal filtering of the partial image statistics). This may improve the smoothness of the updates to the AX algorithms.

In block 220, the processor may provide partial image statistics as input to the AX algorithm that controls the camera. These partial image statistics may be used by the AX algorithms the next time that the camera is capturing a frame (e.g., they may be used to determine an optimum exposure and gain setting for the image sensor such that the target object's detail and dynamic range is well represented in the image). The partial image statistics may be used by the AX algorithms as part of block 206.

In response to determining that a frame should not be captured (i.e., determination block 204="No"), the process may exit, end, terminate, or finish in block 222.

The target object feature vector (as generated in block 202) may remain unchanged throughout method 200. This may be acceptable if the visible part (or at least a large part) of the target object is always the same across the sequence of frames. However, the appearance of the target object may change across frames (e.g., it may rotate, the relative position and/or orientation between the target object and the camera may change, partial obscuration of the target object may occur, changes in illumination/reflectance may occur). In these cases, it may be necessary to update the target object feature vector.

In an enhanced embodiment, the target object feature vector may be updated, or partially updated, at regular intervals (e.g., every x frames). The update rate (1/x) may be fixed (e.g., based on the frame rate of the camera) or it may be variable (e.g., driven by some model of the kinetics of the system).

In an enhanced embodiment, the target object feature vector may be updated when the difference between the target object feature vector and the current selected candidate object feature vector is greater than a certain threshold (e.g., measured by some statistical and/or distance metric).

In an enhanced embodiment, the target object feature vector may be updated when the difference between the target object feature vector and the selected candidate object feature vector is greater than a certain threshold during a number of consecutive frames. The required number of consecutive frames may be chosen statically (e.g., based on empirical data) or dynamically (e.g., driven by information from a kinetic model of the system).

In an alternative embodiment, the distance of the candidate object feature vector (e.g., as computed in block 214 with reference to FIG. 2) may be computed using a combination of the target object feature vector and one or more of the previously selected candidate object feature vectors, rather than using only the target object feature vector. Thus, changes to the appearance of the target object across frames may be considered, but an invalid detection may not lead to undesired target object feature vector updates. This distance (d) may be computed by performing a weighted average of the distances obtained between the candidate object feature vector and the combination of the target object feature vector ($d_{target}$) and one or more of the previously selected candidate object feature vectors ($d_{previous}$) as follows:

$$d_{total} = \alpha \cdot d_{target} + (1-\alpha) \cdot d_{previous}$$

The value of α may be chosen to attribute more or less weight to the initial target object feature vector. α may be controlled dynamically based upon the frame sequence length (e.g., it may be exponentially decreased as the frame sequence gets longer), or it may be controlled based upon some other image parameter (e.g., the region of interest pixel intensity). The target object feature vector may also be updated across the frame sequence (e.g., using a weighted average approach that combines several of the previously selected candidate object feature vectors with the original target object feature vector).

The various embodiments may enable more than one target object to be independently tracked, and the partial image statistics for the AX algorithms may be generated from the resulting multiple selected candidate object bounding boxes (e.g., by using weighted averaging where the weights may be static, or where the weights are calculated dynamically based on parameters such as region of interest intensity, region of interest size, region of interest relative sizes, etc.).

In an embodiment, the trajectory and speed of the target object may be estimated using the previously selected candidate object bounding boxes in order to reduce the number of candidate object bounding boxes, or in order to generate the candidate object bounding boxes where the target object is most likely to be located rather than the location where the target object was previously located (e.g., as part of block 208 with reference to FIG. 2).

Figure 5A:
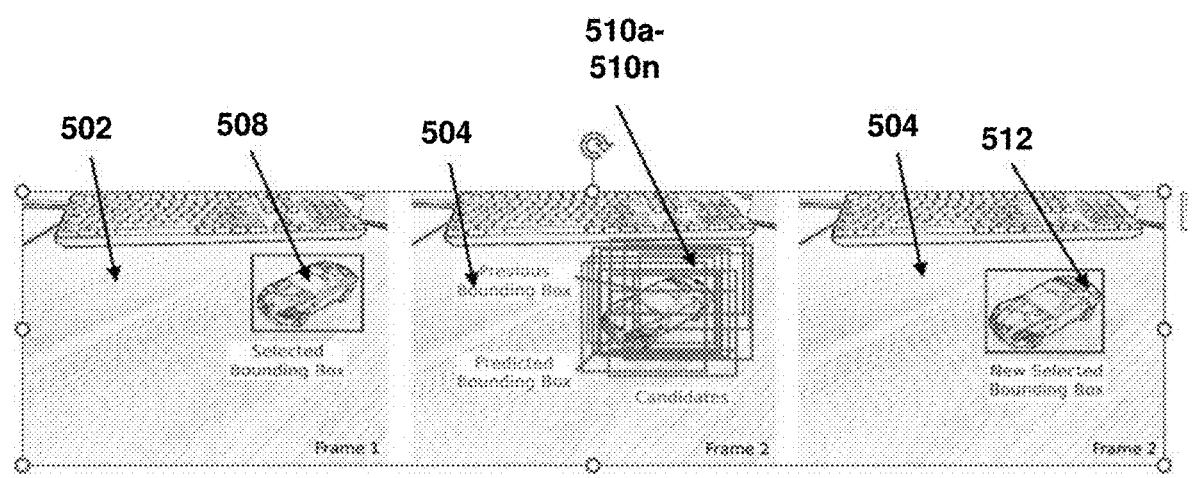
FIGS. 5A and 5B are illustrations of exemplary frames captured in sequence by an embodiment that uses a previously selected candidate object bounding box in order to generate the candidate object bounding boxes where the target object is most likely to be located in accordance with some embodiments.
Figure 5B:
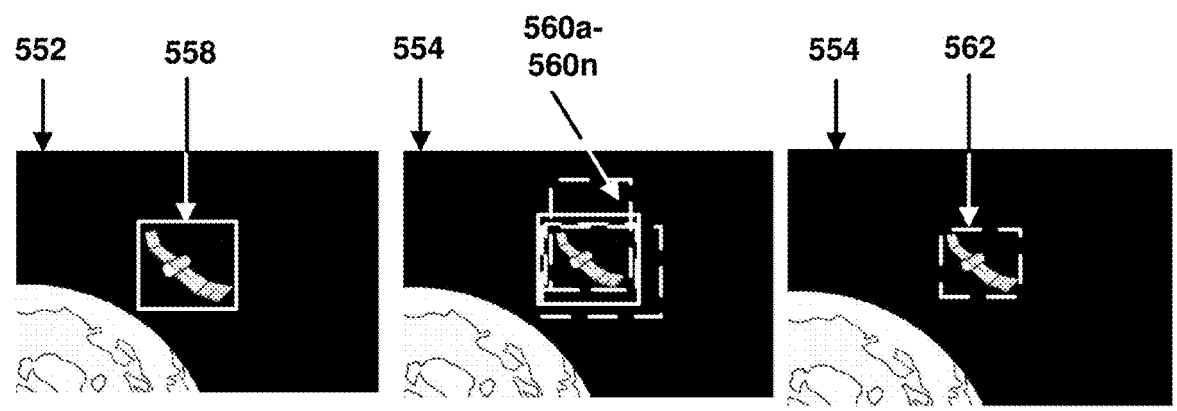

FIG. 5A and FIG. 5B are illustrations of two exemplary frames 502/552, 504/554 captured in sequence by an embodiment that uses a previously selected candidate object bounding box 508/558 in order to generate the candidate object bounding boxes 510a/560a, 510b/560b, 510c/560c, etc. where the target object (i.e., the toy car in FIG. 5A, the satellite in FIG. 5B) is most likely to be located. The selected candidate object bounding box 512/562 may be subsequently selected from these generated candidate object bounding boxes 510a/560a, 510b/560b, 510c/560c, etc.

In an embodiment, the sequence of previously selected candidate object bounding boxes may be used to feed a kinetic model that provides input to the candidate object bounding box generation process for the current frame (e.g., as part of block 208 with reference to FIG. 2). Some candidate object bounding boxes may still need to be generated in the other directions since the target object may change its relative trajectory. The number of previously selected candidate bounding boxes that are used may be set statically or determined dynamically from the kinetic model.

Figure 6:
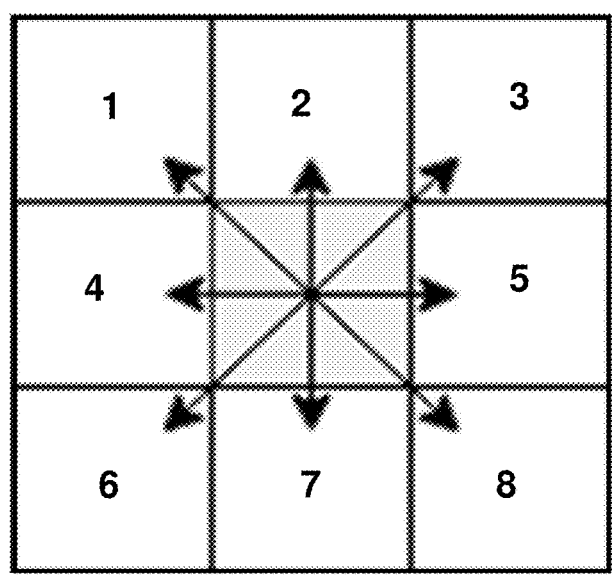
FIG. 6 is an illustration of an exemplary selected candidate bounding box and the possible directions for the target object trajectory.

FIG. 6 is an illustration of an exemplary selected candidate bounding box and the possible directions for the target object trajectory. If each of the previously selected candidate object bounding boxes are north-west of their immediately preceding selected candidate object bounding boxes, then this direction momentum may be used to generate more candidate object bounding boxes for the current frame that are north-west of the selected candidate object bounding box selected for the previous frame. Therefore, more candidate object bounding boxes will be generated north-west of the previously selected candidate object bounding box (i.e., direction 1) than in the other seven directions from the previously selected candidate object bounding box (i.e., directions 2-8).

The Kalman filter is an example of a method that may be used to estimate the position of the target object in the following frame. This filter is widely used for navigation and control of vehicles, trajectory optimizations, etc. A Kalman filter operates by predicting the future state of an object based on a series of measurements observed over time. A Kalman filter may be particularly useful in situations where the data may be inaccurate or uncertain, as it uses well-known mathematical approaches to estimate the probable position and velocity of the object. A Kalman filter may repeatedly or continuously update its estimates based on new data, thereby refining the prediction of the object's position in subsequent frames.

Figure 7:
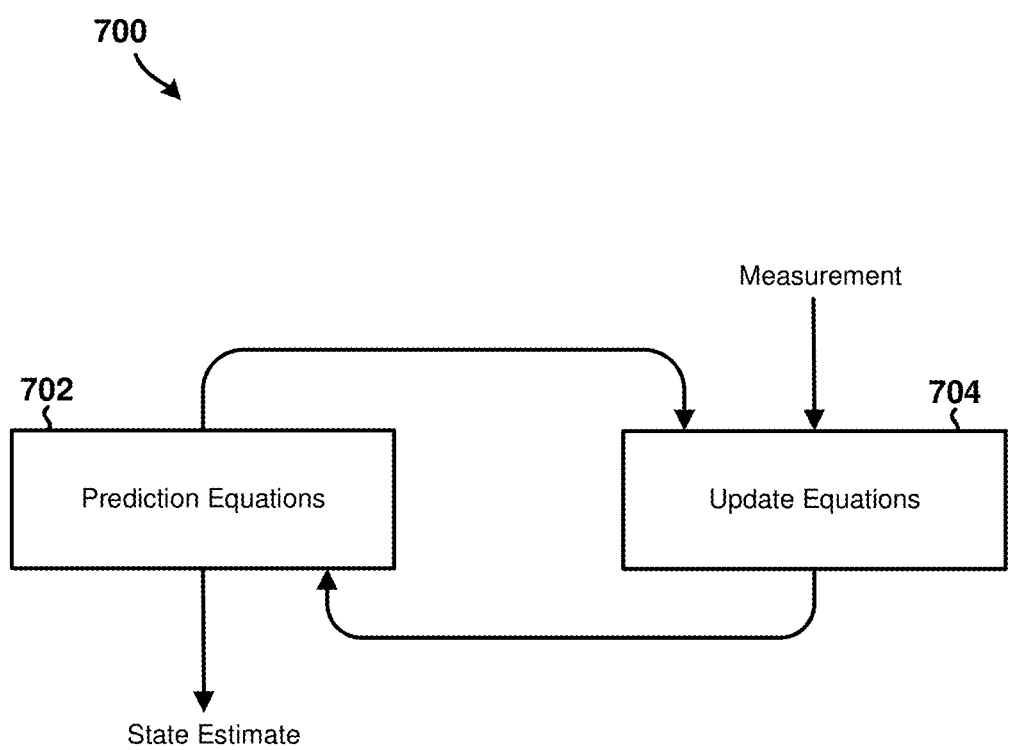
FIG. 7 is a process flow diagram illustrating the Kalman filter method.

FIG. 7 is a process flow diagram illustrating the Kalman filter method 700 in accordance with some embodiments. The first block 702 is a prediction stage where the filter estimates the value of its variables and their uncertainties. In this case, the variables include the position and speed of the target object. The second block 704 is a correction stage where the values of the variables are measured (with some error), and they are then used to update the model. In this case, the real position of the target object will be determined using the selected candidate object bounding box, but the real position will include some degree of error if not all of the target object's possible locations are tested.

The various embodiments may enable size changes in the previously selected candidate object bounding boxes to be used in order to reduce the number of candidate object bounding boxes for the current frame. As with trajectory and speed, the determination of the candidate object bounding box size for the current frame may be based on one or more previous frames (e.g., as a weighted average of the previously selected candidate object bounding box sizes in a specified number of the previous frames), thereby optimizing the target object tracking rate.

For example, if the distance of the target object from the camera increases, then enabling the candidate object bounding box sizes to vary will allow for the relatively smaller appearance of the target object within the subsequent frames. Allowing candidate object bounding box sizes to change may have the additional benefit of reducing the feature vector distance between the target object feature vector and the candidate object feature vector. This may result in selecting a candidate object bounding box with improved localization (i.e., tighter framing of the target object within the bounding box).

In an enhanced embodiment, the momentum of the selected candidate object bounding box size may be used where the relative distance between the target object and the camera changes slowly over time relative to the processing framerate.

The various embodiments may take advantage of CNN parallelization. In some embodiments, it may be possible to build a batch with several candidate object bounding boxes and then to run the inference on the batch at the same time. This is enabled by having all candidate object bounding boxes available simultaneously once a frame is available for processing. Batch processing the candidate object bounding boxes may result in a faster throughput, higher framerate, and smoother object tracking. Alternatively, enabling parallel processing of the candidate object bounding boxes may allow more candidate object bounding boxes to be processed per iteration (e.g., to accommodate tracking of objects that rapidly changing appearance, position, or size).

The various embodiments may enable target object center prelocalization. In order to further reduce the number of candidate object bounding boxes generated, some embodiments may use a Siamese network as a first step to localize the central point of the target object with only one inference.

Figure 8A:
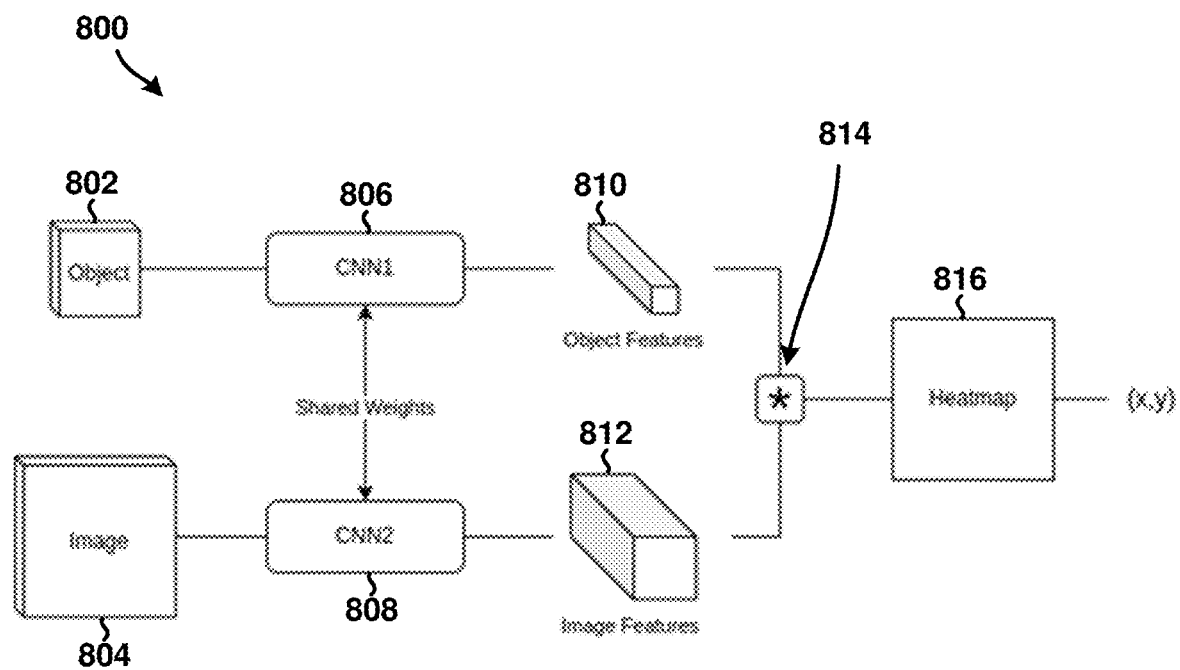
FIGS. 8A and 8B are block diagrams illustrating components in a system configured to perform object center prelocalization for a target object in accordance with some embodiments.
Figure 8B:
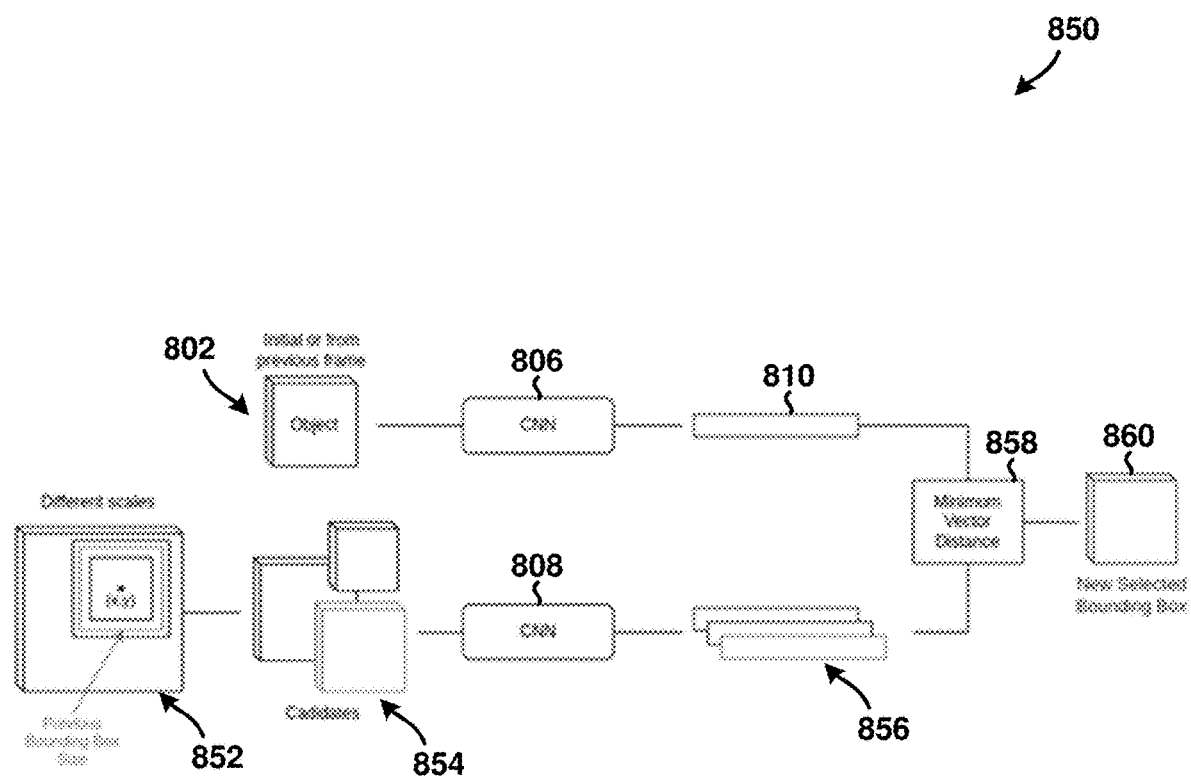

FIG. 8A and FIG. 8B are process flow diagrams illustrating a method of performing object center prelocalization for a target object in accordance with some embodiments. Specifically, FIG. 8A is a process flow diagram illustrating a method 800 of localizing the center point of the target object with only one inference. In an embodiment, two neural networks (i.e., CNN1 806, CNN2 808) with different input sizes may be run. However, both networks share a common architecture and weights so that they are able to extract the same features. One of the networks may be used to extract a tensor of features 810 for the target object 802, whereas the other network may be used to extract the target object 812 from the full frame 804. Once both feature sets are obtained (i.e., object features 810 and image features 812), cross correlation may be performed in operation 814, and a heatmap may be extracted in operation 816. The coordinates of the highest value of the heatmap may provide an estimate of the center point of the target object within the frame.

FIG. 8B is a process flow diagram illustrating a method 850 of subsequently obtaining the candidate object bounding box that surrounds the center point of the target object obtained in method 800. Method 850 may be performed by adding a final regression operation into the Siamese architecture used in method 800. This would typically require additional training. However, since the methods described herein use only already trained models, a method to adjust the new candidate object bounding box may be necessary. Therefore, the method 850 may use the coordinates obtained from method 800 and generate candidate object bounding boxes 854 that are a bit larger and a bit smaller than the previous selected candidate object bounding box. Once the candidate object bounding boxes are determined in block 854, it is possible to apply the same Siamese network (i.e., CNN1 806, CNN2 808) to automatically select the most appropriate candidate object bounding box 860 from the generated candidate object bounding boxes 854, by selecting the candidate object bounding box associated with the minimum distance between the candidate object feature vector and a target object feature vector in block 858.

The various embodiments may enable bounding box optimizations to be applied after the selected candidate object bounding box has been selected (e.g., after block 216 with reference to FIG. 2). In one embodiment, methods for background subtraction may be used (e.g., region growing methods). In another embodiment, a segmentation network may be applied to the image data in a candidate object bounding box to mask only the pixels that belong to the object. This latter approach requires either training the network for the class of object being tracked, or the use of a generic background removal network. The output of these approaches is a mask, as opposed to a bounding box, that includes only the pixels that are associated with the target object. This mask can then be applied to the pixel data prior to generation of the partial image statistics (e.g., as part of block 218 with reference to FIG. 2). In a further embodiment, this mask may be morphologically processed (e.g., via dilation, erosion, opening, or closing) in order to alter the mask morphology so as to ensure that the most salient pixels are used for the generation of the partial image statistics (e.g., by removing ragged mask edges).

In an alternative embodiment, a CNN backbone may be partially or fully retrained on the category of target object within the deployed solution. For example, satellites often deploy solar cell arrays shortly after being deployed from the dispenser. Training the CNN to learn such solar panel features may be beneficial to the overall tracking performance, whilst being generic enough to apply to a large category of satellites but not requiring deployment-specific training.

The various methods described herein may be beneficial in many scenarios. For example, tracking objects can reduce collision risks for automatic vehicle navigation, or they may be used by aircraft for surveillance of roads or private spaces. Similarly, drones may use the methods described herein to follow participants/competitors for recording/broadcasting sports from a high or distant viewpoint, while ensuring that the target participants/competitors are captured optimally by the camera.

The methods described herein may be used in template matching tasks, where the initial target object feature vector is extracted from the image template and it is then searched for in the full image. The methods described herein may also be used in stereo correspondence (e.g., to align two or more images from the same scene captured from two or more cameras).

The methods described herein may enable the automatic tracking of one or more objects using existing CNN backbones via transfer learning, and subsequently using the tracking information as input to AX algorithms in order to optimize the appearance of the target object. By selecting a suitable pre-trained backbone, the tracking may be applied to a target object (or class of target objects) without requiring further training with images of the target object (or class of target objects). Therefore, the prerequisite of a training data set for the target object (or class of target objects), as would normally be required for a CNN based approach, is not required. The tracking can therefore be applied to generic tracking use cases. Furthermore, future training of the backbone is not required, thereby eliminating the time, effort, and power typically required for training. Unlike classical CNN applications, the methods described herein are independent of the target object to be tracked.

The methods described herein may be applied to the task of real-time video capture of satellite dispensing in space. This application particularly benefits from the lack of model training required. The system and the CNN may be kept static because multiple satellites may be dispensed in a single mission, and all that may be required is a new target object feature vector for each satellite. Moreover, since the sequence of satellite deployments is typically planned well in advance of the launch, the swapping of the target feature vectors may be readily mapped to the known satellite deployment sequence.

The methods described herein may be applied in systems containing multiple cameras so that the target object feature vector may be shared across cameras. For example, in the satellite launch vehicle scenario, multiple cameras may be positioned with varied but overlapping fields of view in order to acquire data from multiple vantage points and from a wide overall field of view. In this scenario, the same target object feature vector may be shared across multiple cameras in order to control the AX algorithm for the target objects of interest.

In an embodiment, a central server may manage the target object feature vector distribution amongst the cameras. Furthermore, the central server may update the target object feature vector based on an aggregation (e.g., a weighted combination) of target object feature vectors from multiple cameras in the system. This amounts to a global temporal update of the target object feature vector.

In an enhanced embodiment, the multiple cameras in the system may be calibrated such that they share a known world reference coordinate space. In this embodiment, the target object tracking information and the candidate object locations may be shared across multiple cameras. This may enable better target object tracking in a given camera by utilizing tracking information from the other cameras in the system. This may allow a faster tracking convergence for target objects moving between field of views of the multiple cameras in the system, and it may improve the robustness for regions with overlaps in the individual camera field of views.

In an embodiment, the methods described herein may accommodate for appearance variations of target objects being tracked by incorporating an adjustment factor into the prediction model that is driven by the trend in the minimum feature vector distances across frames. This may allow for the automatic variation of a cut-off threshold that may be used to prevent the methods returning a candidate object bounding box (e.g., when the target object goes out of the field of view).

In an enhanced embodiment, the methods described herein may only be applied to parts (e.g., sub-patches) of the entire image (e.g., in cases where known obstacles are visible in the image). In the example of the satellite launcher camera, parts of the satellite launcher may appear at known fixed locations in the camera field of view (e.g., due to the mounting position of the camera). A patch-based application of the methods may avoid predicting or considering candidate object bounding boxes, in these known locations.

Figure 9A:
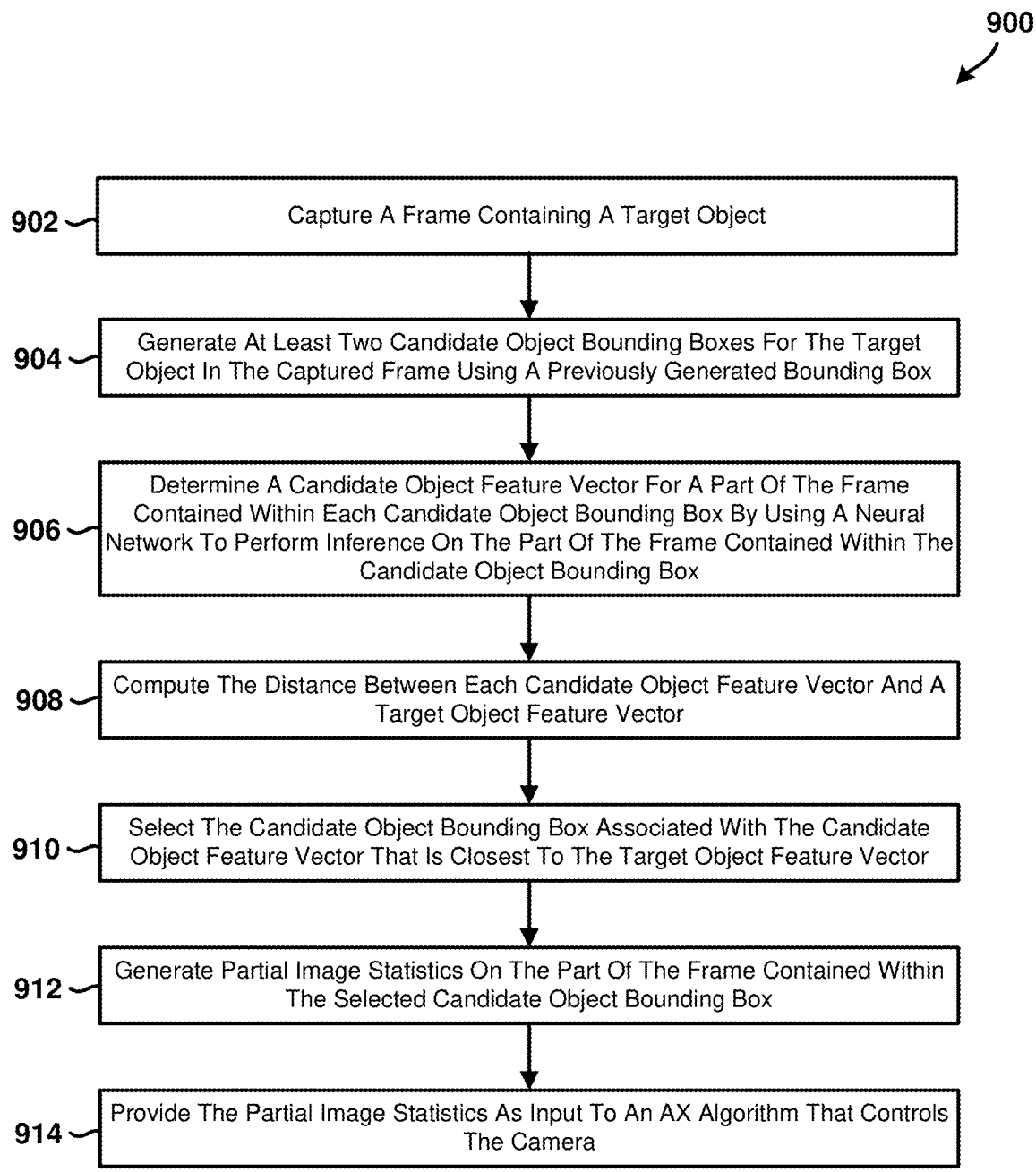
FIGS. 9A and 9B is a process flow diagram illustrating a method of capturing better images of objects that are moving relative to a camera in accordance with some embodiments.
Figure 9B:
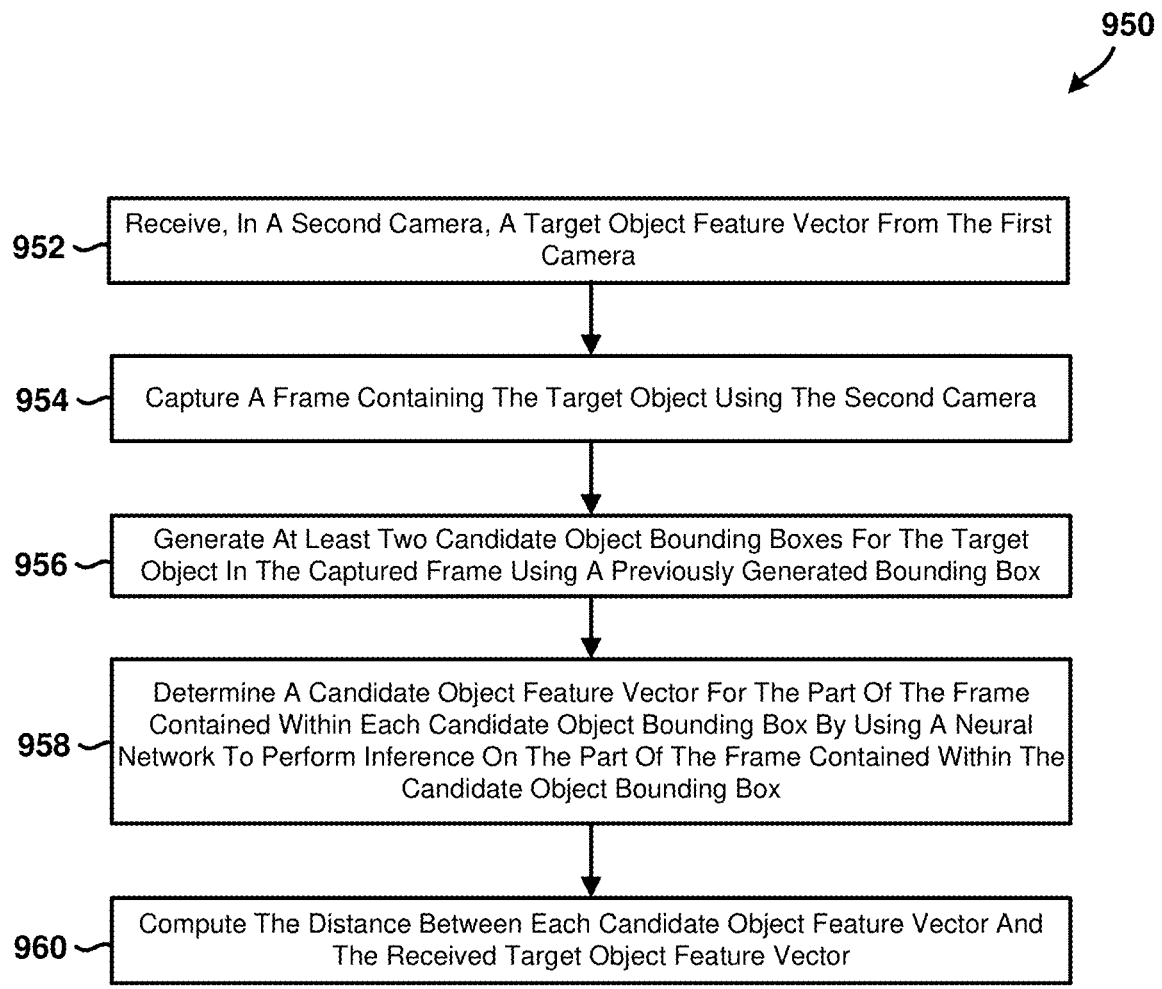

FIGS. 9A and 9B are process flow diagrams illustrating methods 900, 950 of capturing images of objects that are moving relative to a camera in accordance with some embodiments. Methods 900, 950 may be performed by a processing system encompassing a memory and at least one processor, component, or subsystem discussed in this application (e.g., processor 101, 1001, etc.). Means for performing the functions of the operations in methods 900, 950 may include memory, a processing system including at least one processor, and other components or subsystems described herein. Further, one or more processors of the processing system may be configured with software or firmware to perform some or all of the operations of methods 900, 950. In order to encompass the alternative configurations enabled in various embodiments, the hardware implementing any or all of methods 900, 950 is referred to herein as a "processing system," "at least one processor," or "processor."

With reference to FIG. 9A, in block 902, the processing system may capture, using the camera, a frame containing a target object and/or perform the operations described above with reference to block 206 in FIG. 2. In some embodiments, the processing system may capture the frame using a camera that is controlled by an AX algorithm that uses partial image statistics from a part of a frame contained within a bounding box of a previous frame.

In block 904, the processing system may generate at least two candidate object bounding boxes for the target object in the captured frame using a previously generated bounding box and/or perform the operations described above with reference to block 208 in FIG. 2. In some embodiments, the processing system may use a kinetic model to predict the target object's location within the frame and generate at least one candidate object bounding box containing the target object's predicted location. In some embodiments, the processing system may generate at least one candidate object bounding box with a size that is different to the size of the previously generated bounding box. In some embodiments, the processing system may use a Siamese network to localize the central point of the target object and generate at least one candidate object bounding box that is centered on the central point of the target object.

In block 906, the processing system may determine a candidate object feature vector for a part of the frame contained within each candidate object bounding box by using a neural network to perform inference on the part of the frame contained within the candidate object bounding box and/or perform the operations described above with reference to block 212 in FIG. 2. In various embodiments, the operations in block 906 may include using a fixed feature extraction neural network, using a neural network that is partially or full retrained on the type of target objects, and/or using parallelisation to perform inference on the parts of the frame contained within at least two candidate object bounding boxes simultaneously.

In block 908, the processing system may compute the distance between each candidate object feature vector and a target object feature vector and/or perform the operations described above with reference to block 214 in FIG. 2. In some embodiments, the processing system may compute the distance using cosine distance, L1 norm, and/or L2 norm. In some embodiments, the processing system may compute the distance between each candidate object feature vector and a combination of the target object feature vector and at least one previous candidate object feature vector that was closest to the target object feature vector (e.g., by adjusting the weighting of the contribution of the target object feature vector based upon the frame sequence number, etc.).

In block 910, the processing system may select the candidate object bounding box associated with the candidate object feature vector that is closest to the target object feature vector and/or perform the operations described above with reference to block 216 in FIG. 2.

In block 912, the processing system may generate partial image statistics on the part of the frame contained within the selected candidate object bounding box and/or perform the operations described above with reference to block 218 in FIG. 2. In some embodiments, the processing system may generate partial image statistics on the part of the frame contained within the selected candidate object bounding box of a previous frame. In some embodiments, the processing system may use a neural network to create a mask that covers the background pixels in the part of the frame contained within the selected candidate object bounding box and generate partial image statistics on the unmasked pixels in the part of the frame contained within the selected candidate object bounding box.

In some embodiments, method 900 may further include generating and selecting a second candidate object bounding box for a second target object in the captured frame (e.g., as part of the operations in blocks 908 and 910) and generating the partial image statistics on the parts of the frame contained within the selected first and second candidate object bounding boxes in block 912.

In block 914, the processing system may provide the partial image statistics as input to an AX algorithm that controls the camera and/or may perform the operations described above with reference to block 220 in FIG. 2. In some embodiments, the processing system may provide the partial image statistics as input to an algorithm for one or more of controlling the auto exposure of the camera, controlling the auto focus of the camera, controlling the auto white balance of the camera, and controlling the auto noise reduction of the camera.

With reference to FIG. 9B, in block 952, the processing system may receive, in a second camera, a target object feature vector from the first camera.

In block 954, the processing system may capture a frame containing the target object using the second camera.

In block 956, the processing system may generate at least two candidate object bounding boxes for the target object in the captured frame using a previously generated bounding box.

In block 958, the processing system may determine a candidate object feature vector for the part of the frame contained within each candidate object bounding box by using a neural network to perform inference on the part of the frame contained within the candidate object bounding box.

In block 960, the processing system may compute the distance between each candidate object feature vector and the received target object feature vector.

Figure 10A:
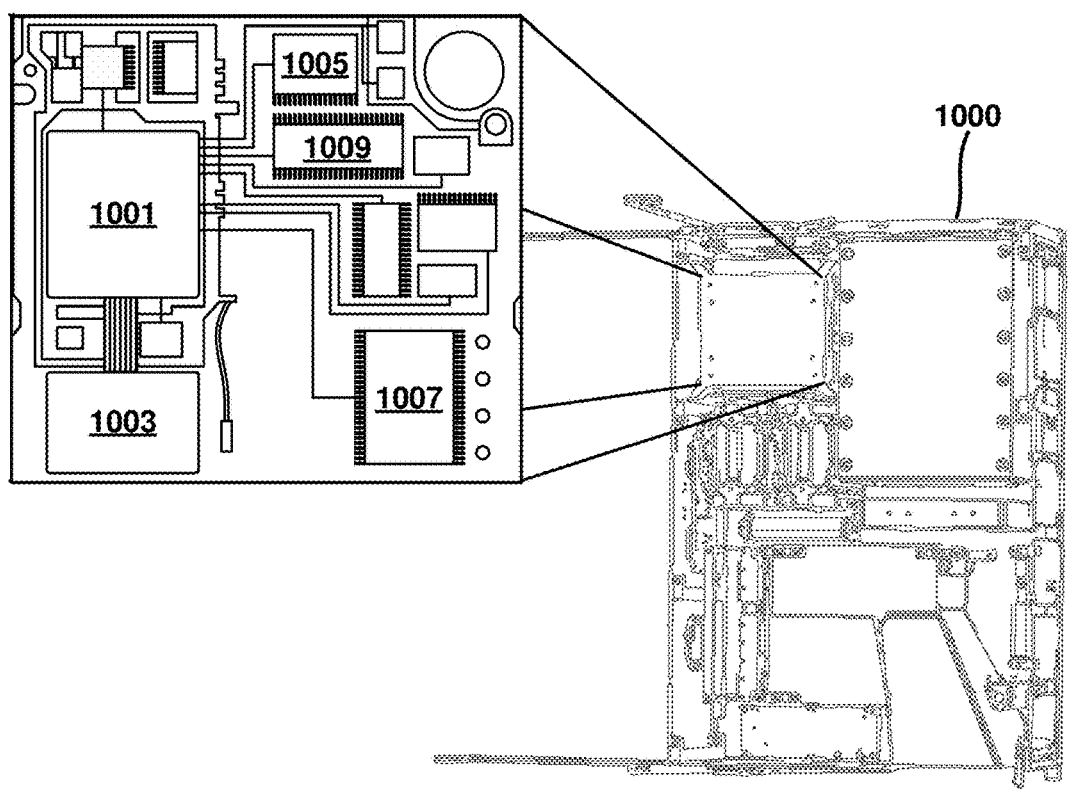
FIG. 10A is a side view of an exemplary satellite (CubeSat) that includes a camera, memory, and a processor that could be configured in accordance with the various embodiments.
Figure 10B:
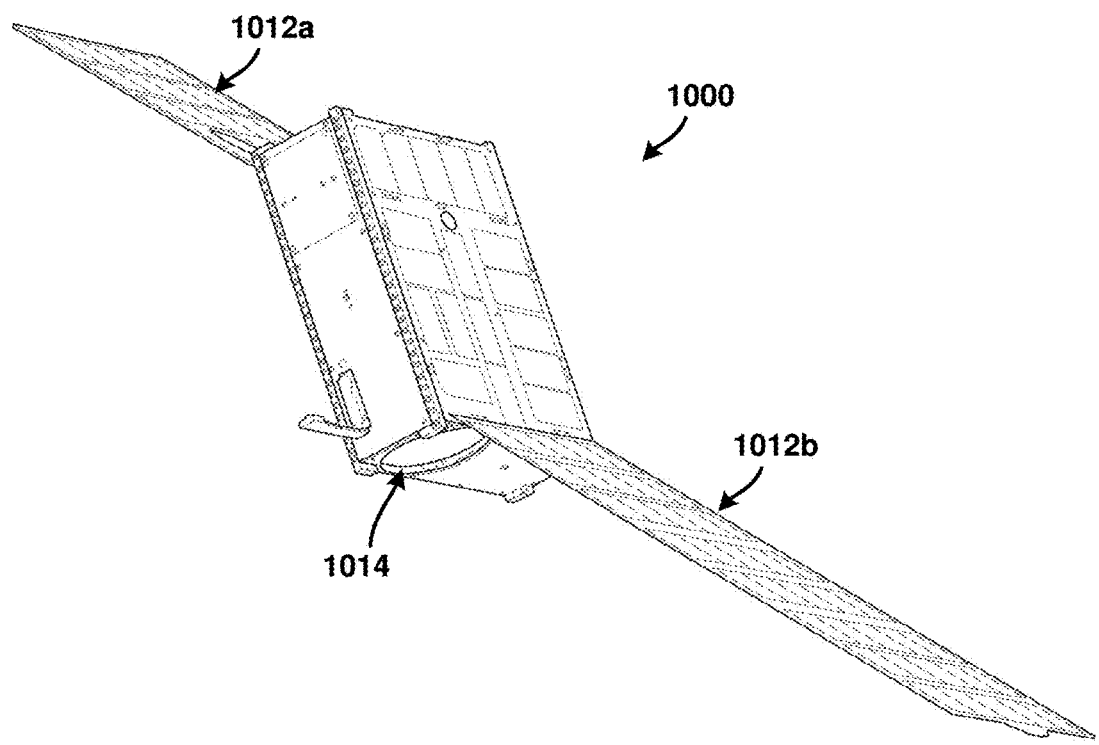
FIG. 10B is an isometric view of the exemplary satellite that includes a camera, memory, and processor that could be configured in accordance with the various embodiments.

The various embodiments may be implemented on any of a variety of different types of computing devices, such as those integrated into modern satellites 114 such as the BoxSat 1002 illustrated in FIGS. 10A and 10B. A BoxSat 1000 may include a processor 1001 coupled to memory 1003, which may include volatile memory and a large capacity nonvolatile memory. The BoxSat 1000 may also include network access ports, communications circuitry and/or a transceiver 1005 coupled to the processor 1001 for establishing data connections with a network. The BoxSat 1000 may also include solar panels 1012*a*, 1012*b* that provide power to the satellite. These panels 1012*a*, 1012*b* may be configured to efficiently convert solar energy into electrical energy, ensuring a sustainable energy source for the satellite's operations. Additionally, the BoxSat 1000 may include various instruments and sensors 1007 for data collection and environmental monitoring. These may be coupled to and/or may include cameras 1014, temperature sensors, radiation detectors, and other scientific instruments, depending on the satellite's specific mission objectives. In addition, the BoxSat 1000 may also include attitude control systems 1009 to maintain the satellite's orientation in space, enabling accurate positioning and data gathering. All these components may be integrated into a robust and compact structure, allowing the BoxSat 1000 to perform complex tasks in the challenging environment of space.

The processor 1001 may be any programmable microprocessor, microcomputer or multiple processor chip or chips that may be configured by software instructions (applications) to perform a variety of functions, including the functions of the various embodiments described below. Multiple processors 1001 may be provided, such as one processor dedicated to wireless communication functions and one processor dedicated to running other applications. Typically, software applications may be stored in the internal memory 1002 before they are accessed and loaded into the processor 1001. The processor 1001 may include internal memory sufficient to store the application software instructions.

Implementation examples are described in the following paragraphs. While some of the following implementation examples are described in terms of example methods, further example implementations may include: the example methods discussed in the following paragraphs implemented by a computing device including a processor configured (e.g., with processor-executable instructions) to perform operations of the methods of the following implementation examples; the example methods discussed in the following paragraphs implemented by a computing device including means for performing functions of the methods of the following implementation examples; and the example methods discussed in the following paragraphs may be implemented as a non-transitory processor-readable storage medium having stored thereon processor-executable instructions configured to cause a processor of a computing device to perform the operations of the methods of the following implementation examples.

Example 1: A method of capturing images of objects that are moving relative to a camera including capturing, using a camera, a frame containing a target object, generating at least two candidate object bounding boxes for the target object in the captured frame using a previously generated bounding box, determining a candidate object feature vector for a part of the frame contained within each candidate object bounding box by using a neural network to perform inference on the part of the frame contained within the candidate object bounding box, computing the distance between each candidate object feature vector and a target object feature vector, selecting the candidate object bounding box associated with the candidate object feature vector that is closest to the target object feature vector, generating partial image statistics on the part of the frame contained within the selected candidate object bounding box, and providing the partial image statistics as input to an AX algorithm that controls the camera.

Example 2: The method of example 1, in which capturing, using the camera, the frame containing the target object includes capturing the frame using a camera that is controlled by an AX algorithm that uses partial image statistics from a part of a frame contained within a bounding box of a previous frame.

Example 3: The method of any of the examples 1 and 2, in which generating at least two candidate object bounding boxes for the target object in the captured frame using a previously generated bounding box includes using a kinetic model to predict the target object's location within the frame and generating at least one candidate object bounding box containing the target object's predicted location.

Example 4: The method of any of the examples 1-3, in which generating at least two candidate object bounding boxes for the target object in the captured frame using a previously generated bounding box includes generating at least one candidate object bounding box with a size that is different to the size of the previously generated bounding box.

Example 5: The method of any of the examples 1-4, in which generating at least two candidate object bounding boxes for the target object in the captured frame using a previously generated bounding box includes using a Siamese network to localize the central point of the target object, and generating at least one candidate object bounding box that is centered on the central point of the target object.

Example 6: The method of any of the examples 1-5, in which determining a candidate object feature vector for the part of the frame contained within each candidate object bounding box by using a neural network to perform inference on the part of the frame contained within the candidate object bounding box includes using a fixed feature extraction neural network.

Example 7: The method of any of the examples 1-6, in which determining a candidate object feature vector for the part of the frame contained within each candidate object bounding box by using a neural network to perform inference on the part of the frame contained within the candidate object bounding box includes using a neural network that is partially or full retrained on the type of target objects.

Example 8: The method of any of the examples 1-7, in which determining a candidate object feature vector for the part of the frame contained within each candidate object bounding box by using a neural network to perform inference on the part of the frame contained within the candidate object bounding box includes using parallelization to perform inference on the parts of the frame contained within at least two candidate object bounding boxes simultaneously.

Example 9: The method of any of the examples 1-8, in which computing the distance between each candidate object feature vector and a target object feature vector includes computing the distance between each candidate object feature vector and a target object feature vector using one or more of cosine distance, L1 norm, and L2 norm.

Example 10: The method of any of the examples 1-9, in which computing the distance between each candidate object feature vector and a target object feature vector includes computing the distance between each candidate object feature vector and a combination of the target object feature vector and at least one previous candidate object feature vector that was closest to the target object feature vector.

Example 11: The method of example 10, in which the combination of the target object feature vector and at least one previous candidate object feature vector that was closest to the target object feature vector includes adjusting the weighting of the contribution of the target object feature vector based upon the frame sequence number.

Example 12: The method of any of the examples 1-11, in which generating partial image statistics on the part of the frame contained within the selected candidate object bounding box includes generating partial image statistics on the part of the frame contained within the selected candidate object bounding box of a previous frame.

Example 13: The method of any of the examples 1-12, in which generating partial image statistics on the part of the frame contained within the selected candidate object bounding box includes using a neural network to create a mask that covers the background pixels in the part of the frame contained within the selected candidate object bounding box, and generating partial image statistics on the unmasked pixels in the part of the frame contained within the selected candidate object bounding box.

Example 14: The method of any of the examples 1-13, in which providing the partial image statistics as input to an AX algorithm that controls the camera includes providing the partial image statistics as input to an algorithm for one or more of controlling the auto exposure of the camera, controlling the auto focus of the camera, controlling the auto white balance of the camera, and controlling the auto noise reduction of the camera.

Example 15: The method of any of the examples 1-14, further including generating and selecting a second candidate object bounding box for a second target object in the captured frame, and generating partial image statistics on the parts of the frame contained within the selected first and second candidate object bounding boxes.

Example 16: The method of any of the examples 1-15, further including receiving, in a second camera, a target object feature vector from the first camera, capturing a frame containing the target object using the second camera, generating at least two candidate object bounding boxes for the target object in the captured frame using a previously generated bounding box, determining a candidate object feature vector for the part of the frame contained within each candidate object bounding box by using a neural network to perform inference on the part of the frame contained within the candidate object bounding box, and computing the distance between each candidate object feature vector and the received target object feature vector.

A number of different types of memories and memory technologies are available or contemplated in the future, any or all of which may be included and used in systems and computing devices that implement the various embodiments. Such memory technologies/types may include dynamic random-access memory (DRAM), double data rate synchronous dynamic random-access memory (DDR SDRAM), electronic (Solid-State) non-volatile computer storage mediums (e.g., Flash Memory), ferroelectric RAM (F-RAM), field programmable read-only memory (FPROM), magnetoresistive RAM (M-RAM), non-volatile random-access memories (NVRAM), one-time programmable non-volatile memory (OTP NVM), phase-change random-access memory (PC-RAM, PRAM, or PCM), programmable read-only memory (PROM), pseudostatic random-access memory (PSRAM), resistive random access memory (ReRAM or RRAM), spin-transfer torque magnetoresistive random-access memory (STT-MRAM), static random-access memory (SRAM), three-dimensional cross point (3D XPoint) memory. Each of the above-mentioned memory technologies includes, for example, elements suitable for storing instructions, programs, control signals, and/or data for use in a computing device, system on chip (SOC) or other electronic component. Any references to terminology and/or technical details related to an individual type of memory, interface, standard, or memory technology are for illustrative purposes only, and not intended to limit the scope of the claims to a particular memory system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general-purpose processor, a digital signal processor (DSP), an application-specific integrated circuit (TCUASIC), a field programmable gate array (FPGA) or other programmable logic devices, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store target program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of capturing images of objects that are moving relative to a camera, the method comprising:
 capturing, using the camera, a frame containing a target object, wherein the camera is controlled by an AX algorithm that uses partial image statistics from a part of a frame contained within a bounding box of a previous frame;
 generating at least two candidate object bounding boxes for the target object in the captured frame using a previously generated bounding box;
 determining a candidate object feature vector for a part of the frame contained within each candidate object bounding box by using a neural network to perform inference on the part of the frame contained within the candidate object bounding box;
 computing the distance between each candidate object feature vector and a target object feature vector;
 selecting the candidate object bounding box associated with the candidate object feature vector that is closest to the target object feature vector;

generating partial image statistics on the part of the frame contained within the selected candidate object bounding box; and
providing the partial image statistics as input to the AX algorithm that controls the camera.

2. The method of claim 1, wherein generating at least two candidate object bounding boxes for the target object in the captured frame using a previously generated bounding box comprises:
using a kinetic model to predict the target object's location within the frame; and
generating at least one candidate object bounding box containing the target object's predicted location.

3. The method of claim 1, wherein generating at least two candidate object bounding boxes for the target object in the captured frame using a previously generated bounding box comprises generating at least one candidate object bounding box with a size that is different to the size of the previously generated bounding box.

4. The method of claim 1, wherein generating at least two candidate object bounding boxes for the target object in the captured frame using a previously generated bounding box comprises:
using a Siamese network to localize the central point of the target object; and
generating at least one candidate object bounding box that is centered on the central point of the target object.

5. The method of claim 1, wherein determining a candidate object feature vector for the part of the frame contained within each candidate object bounding box by using a neural network to perform inference on the part of the frame contained within the candidate object bounding box comprises using a fixed feature extraction neural network.

6. The method of claim 1, wherein computing the distance between each candidate object feature vector and a target object feature vector comprises computing the distance between each candidate object feature vector and a combination of the target object feature vector and at least one previous candidate object feature vector that was closest to the target object feature vector.

7. The method of claim 1, wherein generating partial image statistics on the part of the frame contained within the selected candidate object bounding box comprises generating partial image statistics on the part of the frame contained within the selected candidate object bounding box of a previous frame.

8. The method of claim 1, wherein generating partial image statistics on the part of the frame contained within the selected candidate object bounding box comprises:
using a neural network to create a mask that covers the background pixels in the part of the frame contained within the selected candidate object bounding box; and
generating partial image statistics on the unmasked pixels in the part of the frame contained within the selected candidate object bounding box.

9. The method of claim 1, further comprising:
generating and selecting a second candidate object bounding box for a second target object in the captured frame; and
generating partial image statistics on the parts of the frame contained within the selected candidate object bounding boxes.

10. The method of claim 1, further comprising:
receiving, in a second camera, a target object feature vector from the first camera;
capturing a frame containing the target object using the second camera;
generating at least two candidate object bounding boxes for the target object in the captured frame using a previously generated bounding box;
determining a candidate object feature vector for the part of the frame contained within each candidate object bounding box by using a neural network to perform inference on the part of the frame contained within the candidate object bounding box; and
computing the distance between each candidate object feature vector and the received target object feature vector.

11. A computing device, comprising:
a processing system configured to:
capture, using a camera, a frame containing a target object, wherein the camera is controlled by an AX algorithm that uses partial image statistics from a part of a frame contained within a bounding box of a previous frame;
generate at least two candidate object bounding boxes for the target object in the captured frame using a previously generated bounding box;
determine a candidate object feature vector for a part of the frame contained within each candidate object bounding box by using a neural network to perform inference on the part of the frame contained within the candidate object bounding box;
compute the distance between each candidate object feature vector and a target object feature vector;
select the candidate object bounding box associated with the candidate object feature vector that is closest to the target object feature vector;
generate partial image statistics on the part of the frame contained within the selected candidate object bounding box; and
provide the partial image statistics as input to the AX algorithm that controls the camera.

12. The computing device of claim 11, wherein the processing system is configured to generate the at least two candidate object bounding boxes for the target object in the captured frame using the previously generated bounding box by:
using a kinetic model to predict the target object's location within the frame; and
generating at least one candidate object bounding box containing the target object's predicted location.

13. The computing device of claim 11, wherein the processing system is configured to generate at least two candidate object bounding boxes for the target object in the captured frame using a previously generated bounding box by generating at least one candidate object bounding box with a size that is different to the size of the previously generated bounding box.

14. The computing device of claim 11, wherein the processing system is configured to generate at least two candidate object bounding boxes for the target object in the captured frame using a previously generated bounding box by:
using a Siamese network to localize the central point of the target object; and
generating at least one candidate object bounding box that is centered on the central point of the target object.

15. The computing device of claim 11, wherein the processing system is configured to determine the candidate object feature vector for the part of the frame contained within each candidate object bounding box by using a fixed feature extraction neural network to perform inference on the part of the frame contained within the candidate object bounding box.

16. The computing device of claim 11, wherein the processing system is configured to compute the distance between each candidate object feature vector and the target object feature vector by computing the distance between each candidate object feature vector and the combination of the target object feature vector and at least one previous candidate object feature vector that was closest to the target object feature vector.

17. The computing device of claim 11, wherein the processing system is configured to generate partial image statistics on the part of the frame contained within the selected candidate object bounding box by generating partial image statistics on the part of the frame contained within the selected candidate object bounding box of a previous frame.

18. The computing device of claim 11, wherein the processing system is configured to generate partial image statistics on the part of the frame contained within the selected candidate object bounding box by:
using a neural network to create a mask that covers the background pixels in the part of the frame contained within the selected candidate object bounding box; and
generating partial image statistics on the unmasked pixels in the part of the frame contained within the selected candidate object bounding box.

19. The computing device of claim 11, wherein the processing system is further configured to:
generate and select a second candidate object bounding box for a second target object in the captured frame; and
generate partial image statistics on the parts of the frame contained within the selected candidate object bounding boxes.

20. The computing device of claim 11, wherein the processing system is further configured to:
receive, in a second camera, a target object feature vector from the first camera;
capture a frame containing the target object using the second camera;
generate at least two candidate object bounding boxes for the target object in the captured frame using a previously generated bounding box;
determine a candidate object feature vector for the part of the frame contained within each candidate object bounding box by using a neural network to perform inference on the part of the frame contained within the candidate object bounding box; and
compute the distance between each candidate object feature vector and the received target object feature vector.

21. A non-transitory processor readable media having stored thereon processor-executable instructions configured to cause a processing system to perform operations for capturing images of objects that are moving relative to a camera, the operations comprising:
capturing, using the camera, a frame containing a target object, wherein the camera is controlled by an AX algorithm that uses partial image statistics from a part of a frame contained within a bounding box of a previous frame;
generating at least two candidate object bounding boxes for the target object in the captured frame using a previously generated bounding box;
determining a candidate object feature vector for a part of the frame contained within each candidate object bounding box by using a neural network to perform inference on the part of the frame contained within the candidate object bounding box;
computing the distance between each candidate object feature vector and a target object feature vector;
selecting the candidate object bounding box associated with the candidate object feature vector that is closest to the target object feature vector;
generating partial image statistics on the part of the frame contained within the selected candidate object bounding box; and
providing the partial image statistics as input to the AX algorithm that controls the camera.

22. The non-transitory processor readable media of claim 21, wherein the stored processor-executable instructions are configured to cause the processing system to perform operations such that generating at least two candidate object bounding boxes for the target object in the captured frame using a previously generated bounding box comprises:
using a kinetic model to predict the target object's location within the frame; and
generating at least one candidate object bounding box containing the target object's predicted location.

23. The non-transitory processor readable media of claim 21, wherein the stored processor-executable instructions are configured to cause the processing system to perform operations such that generating at least two candidate object bounding boxes for the target object in the captured frame using a previously generated bounding box comprises generating at least one candidate object bounding box with a size that is different to the size of the previously generated bounding box.

24. The non-transitory processor readable media of claim 21, wherein the stored processor-executable instructions are configured to cause the processing system to perform operations such that generating at least two candidate object bounding boxes for the target object in the captured frame using a previously generated bounding box comprises:
using a Siamese network to localize the central point of the target object; and
generating at least one candidate object bounding box that is centered on the central point of the target object.

25. The non-transitory processor readable media of claim 21, wherein the stored processor-executable instructions are configured to cause the processing system to perform operations such that determining a candidate object feature vector for the part of the frame contained within each candidate object bounding box by using a neural network to perform inference on the part of the frame contained within the candidate object bounding box comprises using a fixed feature extraction neural network.

26. The non-transitory processor readable media of claim 21, wherein the stored processor-executable instructions are configured to cause the processing system to perform operations such that computing the distance between each candidate object feature vector and a target object feature vector comprises computing the distance between each candidate object feature vector and a combination of the target object feature vector and at least one previous candidate object feature vector that was closest to the target object feature vector.

27. The non-transitory processor readable media of claim 21, wherein the stored processor-executable instructions are configured to cause the processing system to perform operations such that generating partial image statistics on the part of the frame contained within the selected candidate object bounding box comprises generating partial image statistics on the part of the frame contained within the selected candidate object bounding box of a previous frame.

28. The non-transitory processor readable media of claim 21, wherein the stored processor-executable instructions are configured to cause the processing system to perform operations such that generating partial image statistics on the part of the frame contained within the selected candidate object bounding box comprises:

using a neural network to create a mask that covers the background pixels in the part of the frame contained within the selected candidate object bounding box; and generating partial image statistics on the unmasked pixels in the part of the frame contained within the selected candidate object bounding box.

29. The non-transitory processor readable media of claim 21, wherein the stored processor-executable instructions are configured to cause the processing system to perform operations further comprising:

generating and selecting a second candidate object bounding box for a second target object in the captured frame; and generating partial image statistics on the parts of the frame contained within the selected candidate object bounding boxes.

30. The non-transitory processor readable media of claim 21, wherein the stored processor-executable instructions are configured to cause the processing system to perform operations further comprising:

receiving, in a second camera, a target object feature vector from the first camera;

capturing a frame containing the target object using the second camera;

generating at least two candidate object bounding boxes for the target object in the captured frame using a previously generated bounding box;

determining a candidate object feature vector for the part of the frame contained within each candidate object bounding box by using a neural network to perform inference on the part of the frame contained within the candidate object bounding box; and computing the distance between each candidate object feature vector and the received target object feature vector.

* * * * *